United States Patent
Ventikos et al.

(10) Patent No.: US 9,984,774 B2
(45) Date of Patent: May 29, 2018

(54) LOCALISED ENERGY CONCENTRATION

(71) Applicant: Isis Innovation Limited, Oxford (GB)

(72) Inventors: Yiannis Ventikos, Oxford (GB);
Nicholas Hawker, Oxford (GB);
Matthew Betney, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 323 days.

(21) Appl. No.: 14/772,941

(22) PCT Filed: Mar. 6, 2014

(86) PCT No.: PCT/GB2014/050661
§ 371 (c)(1),
(2) Date: Sep. 4, 2015

(87) PCT Pub. No.: WO2014/135880
PCT Pub. Date: Sep. 12, 2014

(65) Prior Publication Data
US 2016/0019984 A1    Jan. 21, 2016

(30) Foreign Application Priority Data
Mar. 6, 2013 (GB) .................................. 1304047.2

(51) Int. Cl.
*G10K 15/04* (2006.01)
*G21B 3/00* (2006.01)
*F15B 21/12* (2006.01)

(52) U.S. Cl.
CPC ........... *G21B 3/006* (2013.01); *G10K 15/043* (2013.01); *F15B 21/12* (2013.01)

(58) Field of Classification Search
CPC .......... G21B 3/00; G21B 3/006; G21B 3/008; G10K 15/043
(Continued)

(56) References Cited

U.S. PATENT DOCUMENTS 3,417,829 A    12/1968   Acheson et al.
3,624,239 A    11/1971   Fraas
(Continued)

FOREIGN PATENT DOCUMENTS

CN    1603772 A     4/2005
CN    102759439 A   10/2012
(Continued)

OTHER PUBLICATIONS

Examiner's Appendix: LENR Sonolumiescence.*
(Continued)

*Primary Examiner* — Sharon M Davis
(74) *Attorney, Agent, or Firm* — Cantor Colburn LLP

(57) ABSTRACT

A method of producing a localized concentration of energy includes: creating at least one shockwave propagating through a non-gaseous medium so as first to be incident upon a focusing pocket of fluid within the medium. The focusing pocket of fluid is positioned relative to a differently sized target pocket of gas within the medium, and is arranged to shield the target pocket of gas from the initial shockwave, such that the incidence of the shockwave on the focusing pocket of fluid concentrates the intensity of a shockwave subsequently incident upon the target pocket of gas. An apparatus for producing a localized concentration of energy is also described.

25 Claims, 19 Drawing Sheets

(58) Field of Classification Search
USPC .......................................... 376/100, 102, 149
See application file for complete search history.

(56) References Cited

U.S. PATENT DOCUMENTS

| | | | |
|---|---|---|---|
| 3,953,617 | A | 4/1976 | Smith et al. |
| 4,333,796 | A | 6/1982 | Flynn |
| 7,380,918 | B2 | 6/2008 | Dean, Jr. et al. |
| 7,445,319 | B2 | 11/2008 | Dean, Jr. et al. |
| 2003/0215046 | A1 | 11/2003 | Hornkohl |
| 2008/0037694 | A1 | 2/2008 | Dean, Jr. et al. |
| 2010/0124142 | A1 | 5/2010 | Laugharn, Jr. et al. |
| 2011/0228890 | A1 | 9/2011 | Dearn, Jr. et al. |
| 2012/0281797 | A1 | 11/2012 | Ventikos et al. |
| 2012/0288047 | A1 | 11/2012 | Ventikos et al. |
| 2013/0114774 | A1 | 5/2013 | Ventikos et al. |
| 2015/0139378 | A1 | 5/2015 | Hawker et al. |
| 2016/0012921 | A1 | 1/2016 | Ventikos et al. |

FOREIGN PATENT DOCUMENTS

| | | |
|---|---|---|
| JP | H04158200 | 6/1992 |
| JP | H06198496 | 7/1994 |
| JP | 2001193381 | 7/2001 |
| WO | 02097823 A1 | 12/2002 |
| WO | 03034441 A1 | 4/2003 |
| WO | 2011064592 A1 | 6/2011 |
| WO | 2011064594 A2 | 6/2011 |
| WO | 2011138622 A1 | 11/2011 |

OTHER PUBLICATIONS

"Report of the Investigation Committee in the Matter of Dr. Rusi P. Taleyarkhan." http://news.uns.purdue.edu/x/2008b/080718PurdueReport.pdf last accessed Sep. 27, 2012.
Barbaglia et al.; "Search of Fusion Reactions During the Cavitation of a Single Bubble in Deuterated Liquids"; Physica Scripta, vol. 72; 2005; pp. 75-78.
Bourne et al.; "Shock-Induced Collpase and Luminescence by Cavities"; Philosophical Transactions of the Royal Society London, Series A, vol. 357, No. 1751; 1999; pp. 295-311.
Bourne et al.; "The temperature of a shock-collapsed cavity"; Proceedings of the Royal Society London, Series A, No. 459; 2003, pp. 1851-1861.
Brenner et al.; "Single-bubble sonoluminescence"; Rev. Mod. Phys. vol. 74, No. 2; Apr. 2002; p. 425-484.
Brujan et al.; "Properties of luminescence from laser-created bubbles in pressurized water"; The American Physical Society, vol. 72, No. 6; Dec. 21, 2005, pp. 066310-1-066310-6.
Brunton; "High speed liquid impact"; Royal Society of London Philosophical Transactions Mathematical, Physical and Engineering Sciences, The Royal Society, vol. 260; Jul. 28, 1966; pp. 79-85.
Dear et al.; "High-speed photography of surface geometry effects in liquid/solid impact"; Journal of Applied Physics, vol. 63, No. 4; Feb. 15, 1988; pp. 1015-1021; XP002633349.
Decorso et al.; "Erosion by Liquid Impact"; ASTM International; 1962; p. 41.
Ed. "Bubble fusion: silencing the hype," Mar. 8, 2006 doi: 10.1038/news060306-1 last accessed Sep. 27, 2006, arXiv:physics/0603060v2 last accessed Sep. 27, 2012.
Gaitan et al.; "Sonoluminescence and Bubble Dynamics for a Single, Stable, Cavitation Bubble"; Journal Acoustical Society of America, vol. 91, No. 6; Jun. 1992; pp. 3166-3183.
Gaitan et al.; "Transient cavitation in high-quality-factor resonators at high static pressures"; Journal of the Acoustical Society of America, vol. 127, No. 6; Jun. 2010; pp. 3456-3465; XP002715356.
Galonsky; "Tabletop Fusion Revisted"; Science, vol. 297; Sep. 6, 2002; pp. 1645-1647.
Great Britain Office Action for Great Britain Application No. 1208939.7; dated Sep. 24, 2012; 3 pages.

Haller et al.; "Computational Study of High-Speed Liquid Droplet Impact"; Journal of Applied Physics, vol. 92, No. 5; Sep. 1, 2002; pp. 2821-2828.
Haller et al.; "Wave structure in the contact line region during high speed droplet impact on a surface: Solution of the Riemann problem for the stiffened gas equation of state"; Journal of Applied Physics, vol. 93, No. 5; Mar. 1, 2003; pp. 3090-3097.
Hawker et al.; "Interaction of a Strong Shockwave with a Gas Bubble in a Liquid Medium: a Numerical Study"; J. Fluid Mech., vol. 701; 2012; pp. 59-97.
Hawker et al.; "Shock/Gas Bubble Interactions in Infinite and Finite Volumes of Liquid", 2nd Micro and Nano Flows Confernece, Department of Engineering Science, University of Oxford, Sep. 1-2, 2009, pp. 1-5, West London UK.
International Search Report and Written Opinion for International Application No. PCT/GB2010/051974; International Filing Date Nov. 26, 2010; dated Apr. 28, 2011; pp. 1-11.
International Search Report and Written Opinion for International Application No. PCT/GB2010/051976; International Filing Date Nov. 26, 2010; dated Jun. 9, 2011; pp. 1-11.
International Search Report and Written Opinion for International Application No. PCT/GB2011/05088; International Filing Date May 9, 2011; dated Sep. 16, 2011; pp. 1-12.
International Search Report and Written Opinion for International Application No. PCT/GB2013/051297; International Filing Date May 20, 2013; dated Nov. 20, 2013; pp. 1-11.
International Search Report for International Application No. PCT/GB2014/050661, International Filing Date Mar. 6, 2014, dated Jul. 4, 2014, 5 pages.
International Search Report for International Application No. PCT/GB2014/050663, International Filing Date Mar. 6, 2014, dated Jul. 4, 2014, 5 pages.
Japan Office Action for Japanese Patent Application No. 2012-540500, dated Apr. 28, 2015, 2 pages, non-English Translation.
Japan Office Action for Japanese Patent Application No. 2012-540500, dated Apr. 28, 2015, 3 pages, English Translation.
Japan Office Action for Japanese Patent Application No. 2013-508557, dated Mar. 10, 2015, 5 pages, non-English Translation.
Japan Office Action for Japanese Patent Application No. 2013-508557, dated Mar. 10, 2015, 9 pages, English Translation.
Johnsen et al.; "Numerical simulations of non-spherical bubble collapse"; Journal of Fluid Mechanics, vol. 629; Jun. 25, 2009; pp. 231-262; XP002715357.
Johnsen et al.; "Shock-Induced Collapse of a Gas Bubble in Shockwave Lithotripsy"; J. Acoustical Society of America, vol. 124, No. 4; Oct. 2008; pp. 2011-2020.
Kroninger et al.; "Particle tracking velocimetry of the flow field around a collapsing cavitation bubble"; Exp Fluids, vol. 48, 2010; pp. 395-408.
Lauer et al.; "Numerical Investigation of Collapsing Cavity Arrays"; Physics of Fluids, vol. 24; 2012; pp. 1-24.
Lauterborn et al.; "News from bubble dynamics: high static pressures, shock waves and interior dynamics"; The 19th International Symposium on Nonlinear Acoustics; 2012; 1 page.
Matthujak et al.; "High Speed Jet Formation by Impact Acceleration Method"; Shock Waves, vol. 16; 2007; pp. 405-419.
Naranjo; "Comment on Nuclear Emissions During Self-Nucleated Acoustic Cavitation", Sep. 12, 2006 arxiv:physics/0603060v2 last accessed Sep. 27, 2012.
Peplow; "Desktop Fusion is Back on the Table," Jan. 10, 2006, doi:10.1038/news060109-5 last accessed Sep. 27, 2012.
Philipp et al.; "Cavitation erosion by single laser-produced bubbles"; J. Fluid Mech., vol. 361; 1998; pp. 75-116.
Plesset et al.; "Bubble Dynamics and Cavitation"; Annual Review Fluid Mech., vol. 9; 1977; pp. 145-185.
Range et al.; "Influence of surface roughness on liquid drop impact"; Journal of Colloid and Interface Science, vol. 203; 1998; pp. 16-30.
Reich; "Bubble-fusion scientist debarred from federal funding"; Nature; Nov. 23, 2009; pp. 1-4; doi: 10.1038/news.2009.1103 last accessed Sep. 27, 2012.

(56) References Cited

OTHER PUBLICATIONS

Rein et al.; "Phenomena of liquid drop impact on solid and liquid surfaces"; Fluid Dynamics Research, North-Holland, vol. 12, No. 2; Aug. 1, 1993, pp. 61-93.
Seife; "'Bubble Fusion' Paper Generates a Tempest in a Beaker"; Science; Mar. 8, 2002; vol. 295; p. 1808-1809.
Shapira et al.; "Nuclear Fusion in Collapsing Bubbles—Is It There? An Attempt to Repeat the Observation of Nuclear Emissions from Sonoluminscence"; The American Physical Society, vol. 89, No. 10; Sep. 2, 2002; pp. 1-4.
Shi et al.; "Generation of High-Speed Liquid Jets by High-Speed Impact of a Projectile"; JSME Internation Journal, Series B, vol. 38, No. 2; 1995; pp. 181-190.
Shi et al.; "The Measurement of Impact Pressure and Solid Surface Response in Liquid—Solid Impact up to Hypersonic Range"; Wear, vol. 186-187; 1995; pp. 352-359.
Sivakumar et al.; "Spreading behavior of an impacting drop on a structured rough surface"; Physics of Fluids, vol. 17, No. 10; Oct. 2005; pp. 1-10.
Surov; "Interaction of a Shock Wave with a Bubble Screen"; Technical Physics, vol. 44, No. 1; Jan. 1999; pp. 37-43.
Sushchikh et al.; "Shock Waves and Flow Patterns in a Shock-Induced Bubble Collapse"; American Institute of Aeronautics and Astronautics; 2005; pp. 1-13.
Swantek et al.; "Collapse of Void Arrays Under Stress Wave Loading"; Journal of Fluid Mechanics, vol. 649; Apr. 2010; pp. 399-427.
Taleyarkhan et al. "Evidence for Nuclear Emissions During Acoustic Cavitation"; Science, Research Articles, vol. 295; Mar. 2002; pp. 1868-1873.
Taleyarkhan et al.; "Additional evidence of nuclear emissions during acoustic cavitation"; Phys. Rev. E vol. 69; Mar. 22, 2004, pp. 036109-1-036109-11.
Taleyarkhan et al.; "Nuclear Emissions During Self-Nucleated Acoustic Cavitation"; Phys. Rev. Lett. vol. 96; Jan. 10, 2006; pp. 034301-1-034301-4.
Taleyarkhan et al.; "Reply"; The American Physical Society, Physical Review Letters, PRL 97; 2006; p. 149404-1.
Tullis; "Cavitation Guide for Control Valves"; Tullis Engineering Consultants NUREG/CR-6031; Apr. 1993; pp. 1-106, XP000002654460, http://www.iaea.org/inis/collectin/NCLCollectionStore/_Public/24/072/24072618.pdf.
Wolfrum et al.; "Luminescence of transient bubbles at elevated ambient pressures"; The American Physical Society, vol. 64; Sep. 25, 2001; pp. 046306-1-046306-5.
Written Opinion for International Application No. PCT/GB2014/050661, International Filing Date Mar. 6, 2014, dated Jul. 4, 2014, 7 pages.
Written Opinion for International Application No. PCT/GB2014/050663, International Filing Date Mar. 6, 2014, dated Jul. 4, 2014, 7 pages.
Xu et al., "Confirmatory experiments for nuclear emissions during acoustic cavitation," Nuc. Engr. Des. v. 235, Feb. 21, 2005, p. 1318-1324.
Goverdovskii et al "On the prospects of bubble cavitation-induced fusion"; Phys. Usp.; 2013; 56; 423-425.
Lindstrom "Believable statements of uncertainty and believable science"; J Radioanal Nucl Chem; 2017; 311; 1019-1022.

\* cited by examiner

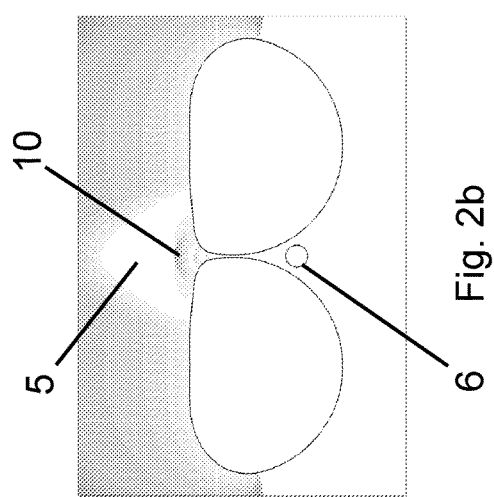
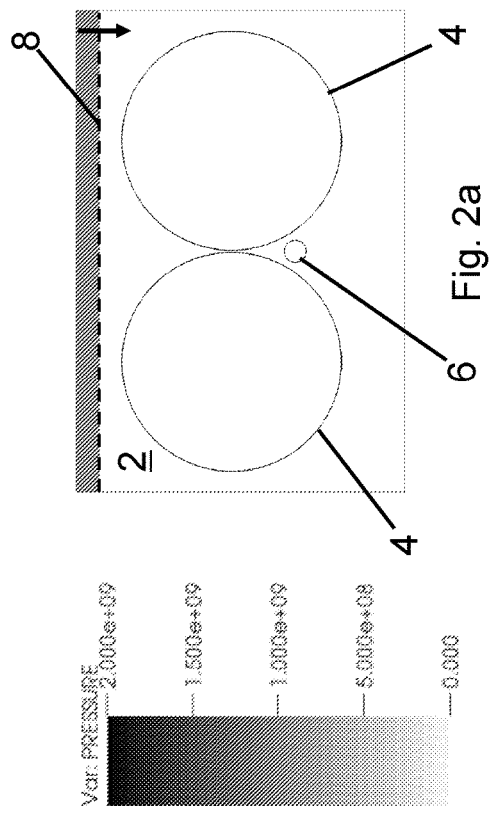
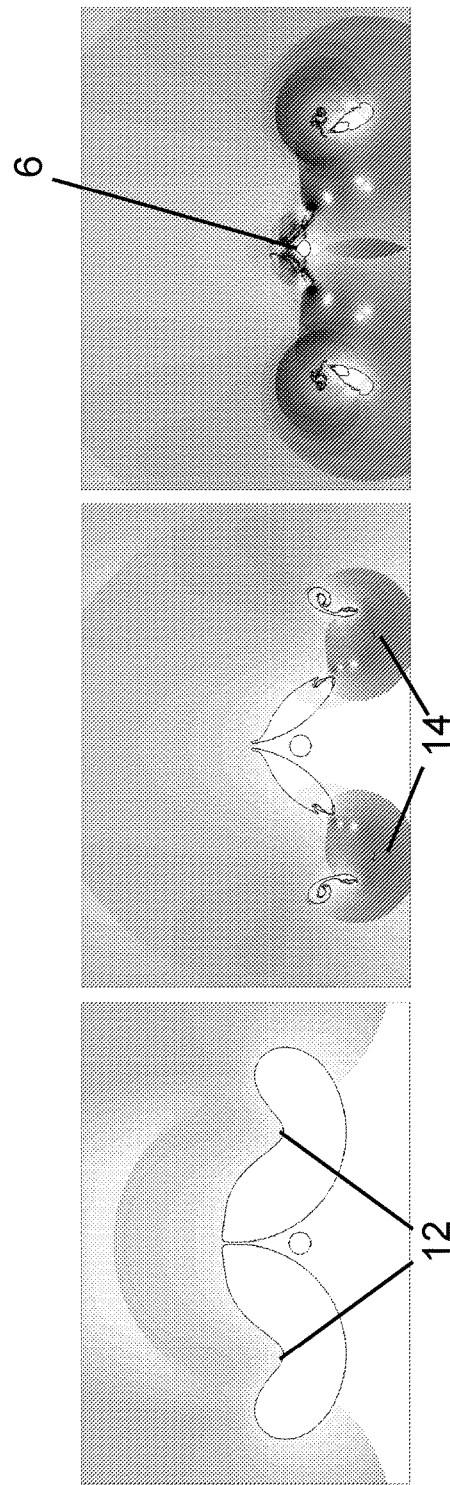

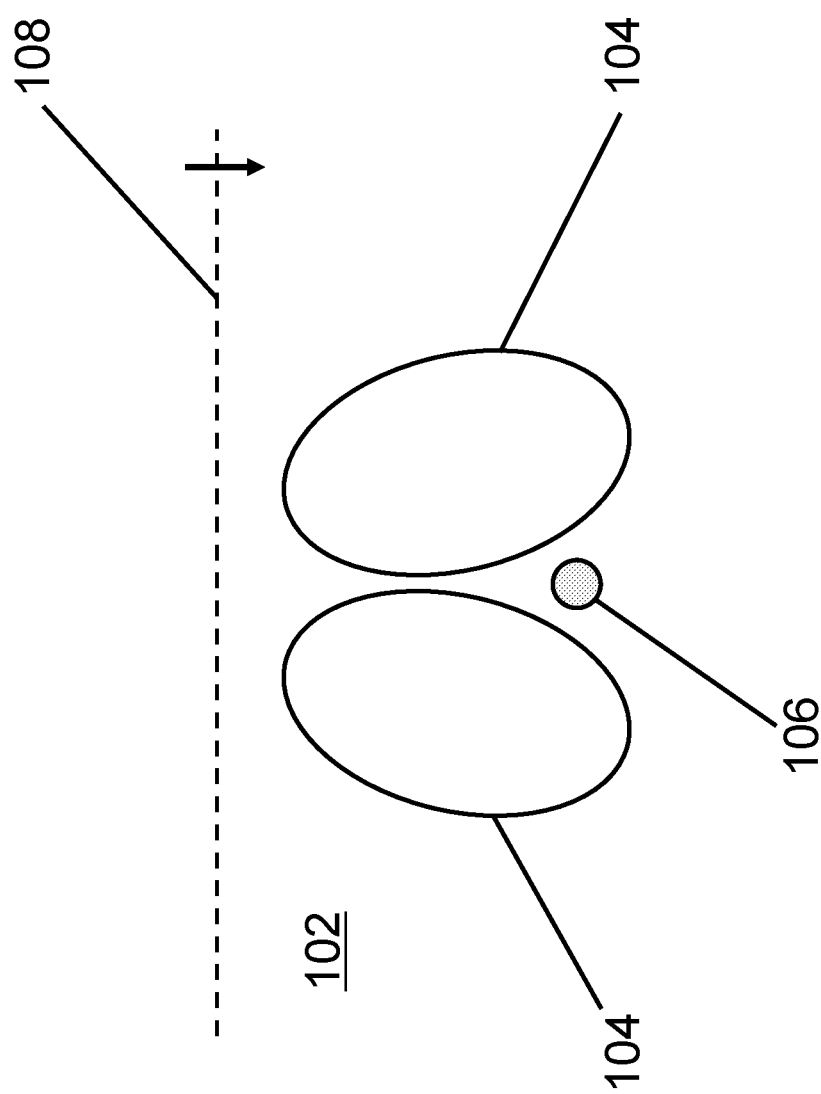

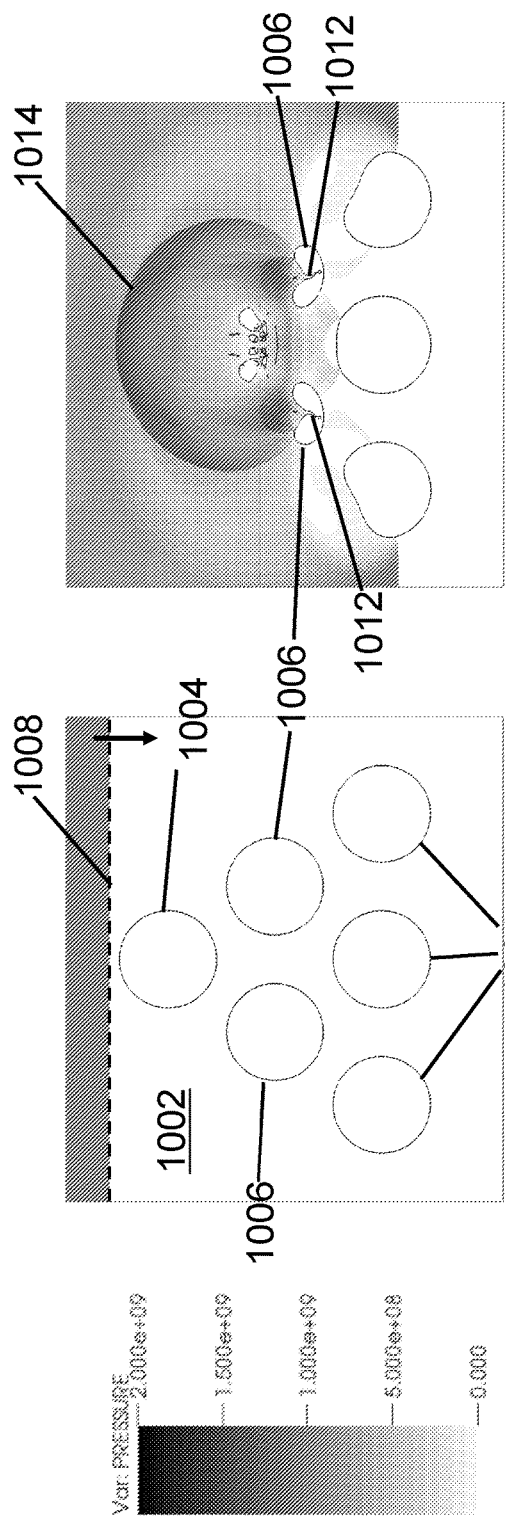
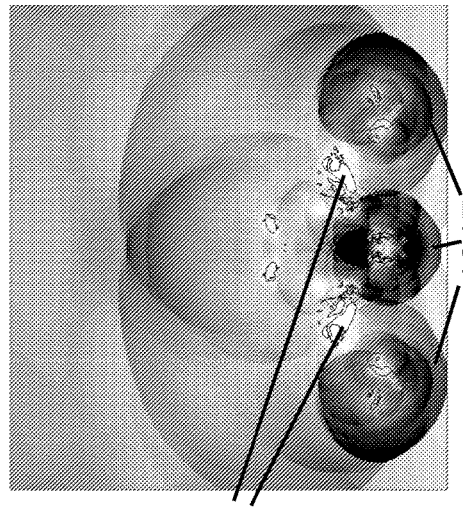
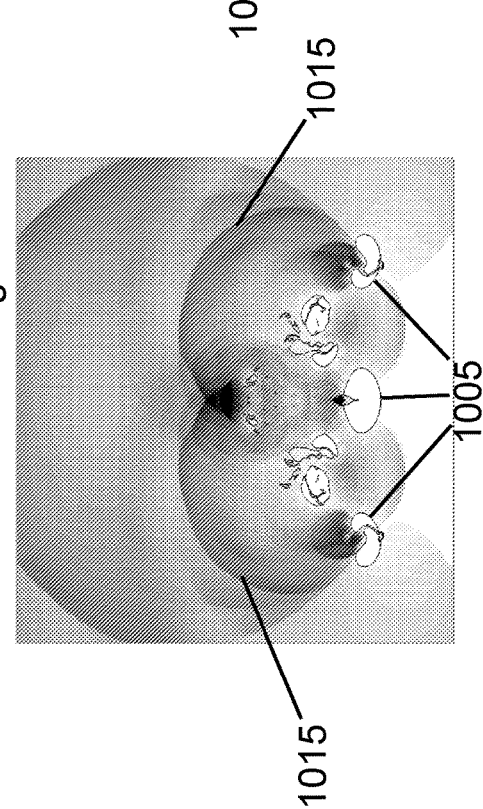
Fig. 14a
Fig. 14b
Fig. 14c
Fig. 14d

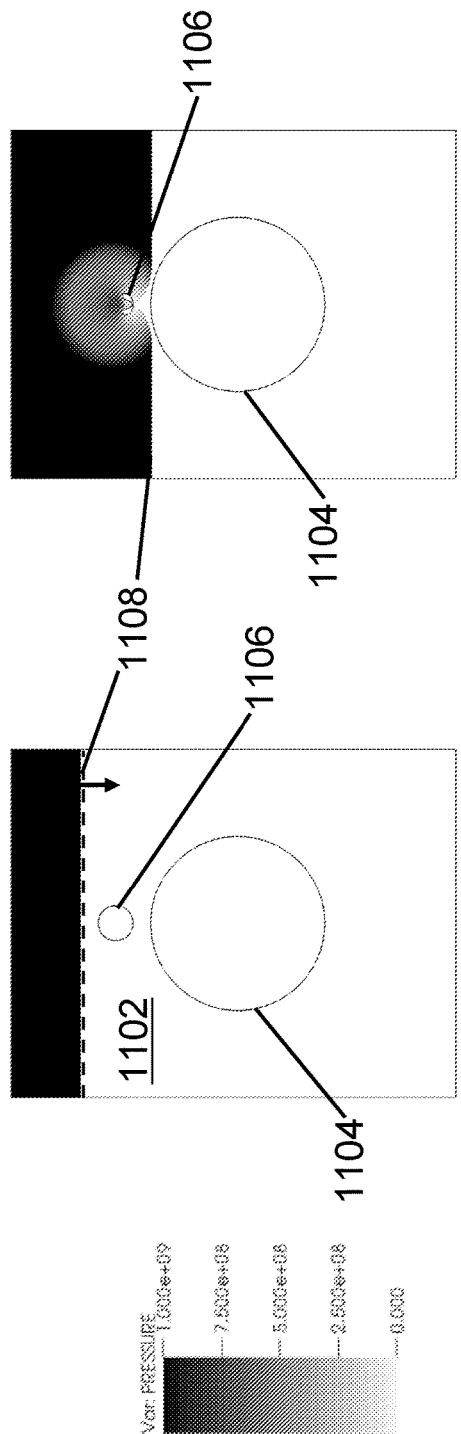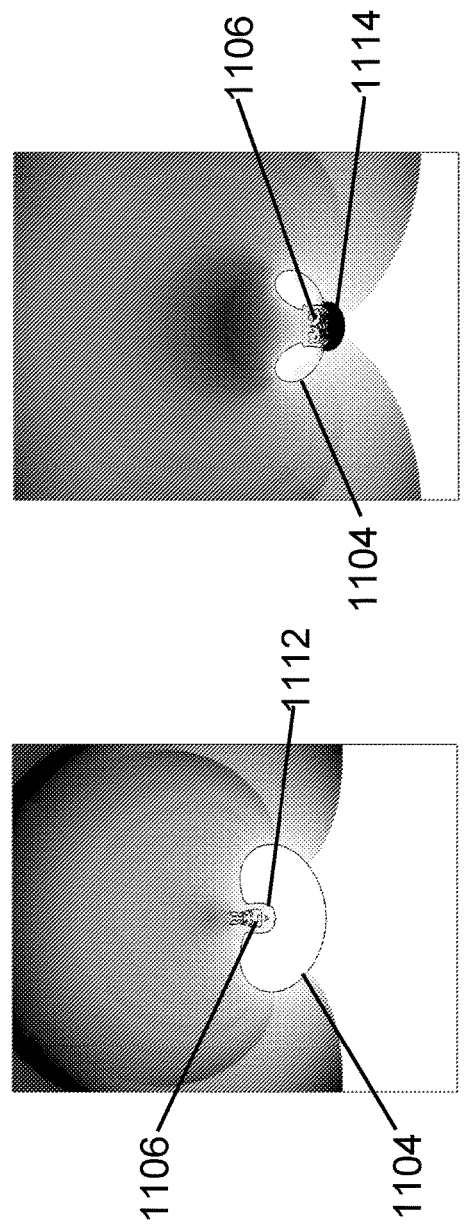
Fig. 16a
Fig. 16b
Fig. 16c
Fig. 16d

LOCALISED ENERGY CONCENTRATION

CROSS REFERENCE TO RELATED APPLICATIONS

This is a U.S. national stage of application No. PCT/GB2014/050661, filed on 6 Mar. 2014. Priority under 35 U.S.C. § 119(a) and 35 U.S.C. § 365(b) is claimed from Great Britain Application No. 1304047.2 filed on 6 Mar. 2013, the disclosure of which is also incorporated herein by reference in its entirety.

TECHNICAL FIELD

This disclosure relates to methods and apparatuses for producing very high localised energies. It relates particularly, although not exclusively, to generating localised energies high enough to cause nuclear fusion.

BACKGROUND

The development of fusion power has been an area of massive investment of time and money for many years. This investment has been largely centred on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small volumes.

Much of the confidence in the potential in alternative methods of inertial confinement fusion comes from observations of a phenomenon called sonoluminescence. This occurs when a liquid containing appropriately sized bubbles is driven with a particular frequency of ultrasound. The pressure wave causes bubbles to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A., *Journal of the Acoustical Society of America,* 91(6), 3166-3183 June (1992)]. There have been various efforts to intensify this process and one group has claimed to observe fusion [Taleyarkhan, R. P., West, C. D., Cho, J. S., Lahey, R. T., Nigmatulin, R. I., and Block, R. C., *Science,* 295(5561), 1868-1873 March (2002)]. However, the observed results have not yet been validated or replicated, in spite of substantial effort [Shapira, D. and Saltmarsh, M., *Physical Review Letters,* 89(10), 104302 September (2002)]. This is not the only proposed mechanism that has led to luminescence from a collapsing bubble; however it is the most documented. Luminescence has also been observed from a bubble collapsed by a strong shock wave [Bourne, N. K. and Field, J. E., *Philosophical Transactions of the Royal Society of London Series A—Mathematical Physical and Engineering Sciences,* 357 (1751), 295-311 February (1999)]. It is this second mechanism, i.e. the collapse of a bubble using a shockwave, to which this invention relates.

It has been proposed in U.S. Pat. No. 7,445,319 to fire spherical drops of water moving at very high speed (~1 km/s) into a rigid target to generate an intense shock wave. This shock wave can be used to collapse bubbles that have been nucleated and subsequently have expanded inside the droplet. It is inside the collapsed bubble that the above-mentioned patent expects fusion to take place. The mechanism of shockwave generation by high-speed droplet impact on a surface has been studied experimentally and numerically before and is well-documented (including work by one of the present patent inventors, [Haller, K. K., Ventikos, Y., Poulikakos, D., and Monkewitz, P., *Journal of Applied Physics,* 92(5), 2821-2828 September (2002)]). The present invention differs from U.S. Pat. No. 7,445,319, even though the fundamental physical mechanisms are similar, because it does not utilise a high speed droplet impact.

SUMMARY

The present invention aims to provide alternatives to the aforementioned techniques and may also have other applications. When viewed from a first aspect the invention provides a method of producing a localised concentration of energy comprising:

creating at least one shockwave propagating through a non-gaseous medium so as first to be incident upon a focusing pocket of fluid within the medium;

wherein the focusing pocket of fluid is positioned relative to a differently sized target pocket of gas within the medium, and is arranged to shield the target pocket of gas from the initial shockwave, such that the incidence of the shockwave on the focusing pocket of fluid concentrates the intensity of a shockwave subsequently incident upon the target pocket of gas.

The invention also extends to an apparatus for producing a localised concentration of energy comprising:

a non-gaseous medium having therein a focusing pocket of fluid and a differently sized target pocket of gas;

means for creating at least one shockwave propagating through said non-gaseous medium so as first to be incident upon said focusing pocket of fluid;

wherein the focusing pocket of fluid is positioned relative to the target pocket of gas within the medium, and is arranged to shield the target pocket of gas from the initial shockwave, such that the incidence of the shockwave on the focusing pocket of fluid concentrates the intensity of the shockwave subsequently incident upon the target pocket of gas.

It is known to those skilled in the art that in general an interaction between a shockwave in a non-gaseous medium and a pocket of fluid (a "bubble") of different composition to and in that medium can generate a high speed transverse jet of the non-gaseous medium that moves across the bubble, impacting the leeward bubble wall. This is one of the mechanisms which gives rise to the well-known problem of cavitation damage of surfaces when shockwaves are generated in the presence of micro-bubbles formed on the surface. In accordance with the present invention however, the inventors have appreciated that this naturally-occurring phenomenon can be appropriately adapted and harnessed to produce very high localised energy concentration which can be used, for example, to create nuclear fusion as will be explained later.

The phenomenon of a jet being formed during collapse of the focusing pocket of fluid leads to various physical mechanisms that cause very substantial energy focusing in the target pocket of gas. One of these mechanisms is a simple transfer of kinetic energy from the jet when it impacts on the leeward side of the focusing pocket of fluid into creating various high velocity and/or high pressure phenomena, for example the creation of an outward moving shockwave which can be over ten times the pressure of the incident shockwave. This more intense shockwave then interacts with the target pocket of gas, compressing and heating it. As will be appreciated, this enables greater pressures and temperatures to be obtained in the target pocket of gas than if the shockwave simply was incident upon the target pocket of gas without the presence of the focusing pocket of fluid.

In accordance with the invention the focusing and target pockets are arranged, by shielding the target pocket of gas from the initial shockwave, such that the shockwave in the medium is incident upon the focusing pocket of fluid before being incident upon the target pocket of gas. This enables the focusing pocket of fluid to generate a more intense shockwave from the initial shockwave which is then incident upon the target pocket of gas. In one set of embodiments the shielding could simply comprise the focusing pocket of fluid itself, i.e. the focusing pocket is arranged at least partly to shield the target pocket of gas from the shockwave in the non-gaseous medium. In one exemplary embodiment the target pocket is positioned on the opposite side of the focusing pocket from the direction of incidence of the initial shockwave. Although the relative sizes of the focusing and target pockets is not important, it will be appreciated that this shielding is most effective when the focusing pocket of fluid is larger in size than the target pocket of gas.

In general, in some embodiments of the invention, the relative size of the focusing and target pockets is not important, as long as they are of different sizes, however in one set of embodiments the focusing pocket of fluid is larger in size than the target pocket of gas, i.e. it has a greater volume. The inventors have seen this to be advantageous in shielding the target pocket of gas from the initial shockwave, however in general it is also advantageous as it allows the greater volume, and therefore also generally a greater projected area, to be presented to the initial shockwave. This is able to harness more of the energy from the initial shockwave, which is then intensified to be incident upon the target pocket of gas, than if the target pocket of gas was the same size or larger than the focusing pocket of fluid.

Preferably the focusing pocket of fluid has a diameter at least 1.5 times the diameter of the target pocket of gas, e.g. 2 times the diameter, e.g. 3 times the diameter, e.g. 5 times the diameter. The recital of the diameter of the focusing pocket of fluid and the target pocket of gas does not necessarily imply that the bubbles are spherical, or indeed circular in cross-section. If one or both of the focusing pocket of fluid and the target pocket of gas are not spherical or circular in cross-section, the diameter refers to the equivalent dimension of the pocket shape, e.g. the diameter of the smallest sphere which encloses the pocket.

The invention has a number of advantages, as discussed above, which may be realised with only singular focusing and target pockets. However, the inventors have devised a number of different embodiments in which multiple focusing and/or target pockets are provided. In one set of embodiments the apparatus and method comprise a plurality of focusing pockets of fluid. Providing a plurality of focusing pockets of fluid increases the volume and area over which the energy of initial shockwave is incident, therefore enabling a greater amount of the energy from the shockwave to be harnessed for intensifying the shockwave onto the target pocket of gas. Furthermore, it can allow the energy of multiple initial shockwaves to be harnessed and concentrated onto the one or more target pockets of gas, as is discussed below.

The plurality of focusing pockets of fluid can also be positioned to shield the target pocket of gas. Consider an embodiment in which the target pocket of gas is positioned on the opposite side of two focusing pockets of fluid from the incident shockwave, and the target pocket is centred between the two focusing pockets. Although there is a gap between the two focusing pockets, through which the target pocket can "see" the incident shockwave, the target pocket is not struck by the initial shockwave incident upon the two focusing pockets as it is shielded by a mechanism of reflected rarefactions bouncing between the two focusing pockets. Alternatively stated, the shape of the channel between the two focusing pockets heavily attenuates the incident shockwave; it is the design of the region between the two focusing pockets that generates the shielding effect, it is not necessarily a direct consequence of the pockets' own shape or position. Consequently the target pocket is not collapsed by the initial shockwave but by the much stronger secondary shockwaves that are generated by the collapse of the two focusing pockets. The increased strength of these secondary shockwaves, as well as having two sets of shockwaves interacting together, one set from each focusing pocket, significantly enhances the collapse of the target pocket of gas, thereby increasing the pressure and temperature generated. It will be appreciated that a similar shielding of the target pocket of gas by the two focusing pockets of fluid can also be achieved if the two focusing pockets are joined together, e.g. in a dumbbell shape as is discussed below.

In one set of embodiments the plurality of focusing pockets of fluid are positioned relative to each other such that the centre of one focusing pocket of fluid is spaced from the centre of its adjacent focusing pocket of fluid by less than 2 times the diameter of the larger of the two adjacent focusing pockets of fluid. Preferably the spacing is less than 1.5 times the diameter of the larger of the two adjacent focusing pockets of fluid, e.g. less than 1.2 times the diameter. Where there are more than two focusing pockets of fluid, the spacing of the focusing pockets of fluid is judged relative to the nearest adjacent focusing pocket of fluid, i.e. it is not essential for all the plurality focusing pockets of fluid to be this close together.

Embodiments with more than two focusing pockets of fluid are also envisaged, for example an array of focusing pockets of fluid. These can all be arranged to shield the target pocket of gas, as has been discussed for two focusing pockets, and/or they can be used simply to provide multiple shockwaves enabling a greater amount of the energy from the shockwave to be harnessed for intensifying the shockwave onto the target pocket of gas. The plurality of focusing pockets of fluid (including the case with two focusing pockets), e.g. in an array, can be arranged relative to the target pocket of gas such that the resultant shockwaves, from their collapse after the initial shockwave is incident upon them, are incident simultaneously upon the target pocket of gas. This arrangement maximises the intensity of the overall converging shockwave incident upon the target pocket of gas, thus maximising the pressure and temperature of the compressed volume of gas. Alternatively, the plurality of focusing pockets of fluid can be arranged relative to the target pocket of gas such that the resultant shockwaves are incident upon the target pocket of gas at different times. This can be used to prolong the incidence of the resultant shockwaves on the target pocket of gas, e.g. to help create a sustained reaction within the volume of gas.

As well as being arranged to coordinate the timings of the resultant shockwaves incident upon the target pocket of gas, the plurality of focusing pockets of fluid can also be arranged to coordinate the shape of the overall resultant shockwave. For example, the plurality of focusing pockets of fluid can be arranged relative to the target pocket of gas such that the overall resultant shockwave, when incident upon the target pocket of gas, conforms to some extent to the shape of the target pocket. This yields a stronger, more intense, collapse of the target pocket.

In a set of embodiments comprising a plurality of focusing pockets of fluid, these pockets could all be positioned relative to the initial shockwave in the non-gaseous medium and the target pocket of gas such that the shockwave is incident upon all the focusing pockets of fluid before the resultant shockwaves are incident upon the target pocket of gas, but this is not essential.

In a set of embodiments, one or more further pockets of fluid are positioned further away from the initial shockwave than the target pocket of gas. In this arrangement the initial shockwave is first incident upon one or more of the focusing pockets of fluid, creating a resultant shockwave which is then incident upon the target pocket of gas, before the resultant shockwave is incident upon the further pocket(s) of fluid. This causes collapse of this/these further pocket(s), resulting in a further shockwave which is then incident upon the remains of the target pocket of gas, compressing it further, potentially increasing the yield of the reaction within the target pocket.

In one set of embodiments the apparatus comprises a plurality of target pockets of gas. This arrangement can be used to increase the volume of gas (and therefore fuel or reactants) to be compressed in order to increase the yield achieved. The plurality of target pockets of gas could be arranged around a single focusing pocket of fluid, e.g. to maximise the amount of the resultant shockwave from the collapse of the focusing pocket which is used to compress the target pockets, however this set of embodiments is particularly suited when there are a plurality of focusing pockets of fluid. Therefore in one set of embodiments the apparatus comprises a plurality of focusing pockets of fluid and a plurality of target pockets of gas. These multiple pockets can be arranged in any number of ways, e.g. in combinations of the embodiments described above, and in general will be arranged such that the collapse of the plurality of the focusing pockets of fluid from the incidence of the initial shockwave creates multiple resultant shockwaves which are then incident upon the plurality of target pockets of gas.

In a set of embodiments the shielding for the target pocket of gas could comprise a solid obstacle, e.g. immovable within the non-gaseous medium, or it could comprise a pressure wave, e.g. an ultrasonic standing wave, arranged to deflect the incident shockwave away from the target pocket of gas. This is considered novel and inventive in its own right and therefore when viewed from a further aspect the invention provides a method of producing a localised concentration of energy comprising:

creating at least one shockwave propagating through a non-gaseous medium so as first to be incident upon a focusing pocket of fluid within the medium;

wherein the focusing pocket of fluid and a solid obstacle are positioned within the medium relative to a target pocket of gas within the medium, and the solid obstacle is arranged to shield the target pocket of gas from the initial shockwave, such that the incidence of the shockwave on the focusing pocket of fluid concentrates the intensity of a shockwave subsequently incident upon the target pocket of gas.

The invention also extends to an apparatus for producing a localised concentration of energy comprising:

a non-gaseous medium having therein a focusing pocket of fluid, a target pocket of gas and a solid obstacle;

means for creating at least one shockwave propagating through said non-gaseous medium so as first to be incident upon said focusing pocket of fluid;

wherein the focusing pocket of fluid and the solid obstacle are positioned relative to the target pocket of gas within the medium, and the solid obstacle is arranged to shield the target pocket of gas from the initial shockwave, such that the incidence of the shockwave on the focusing pocket of fluid concentrates the intensity of the shockwave subsequently incident upon the target pocket of gas.

The solid obstacle is substantially unaffected by the incidence of the shockwave upon it and may comprise a particle of solid material embedded within the non-gaseous medium, for example a steel particle of similar diameter to the adjacent pockets. These are further ways to shield the target pocket from the initial shockwave, allowing it to be undisturbed until the resultant shockwave from the collapse of the focusing pocket of gas is incident upon it. One advantage of these arrangements, in the embodiments which comprise a plurality of focusing pockets of fluid, is that they can allow the focusing pockets of fluid to be spaced further apart from each other than if they are used to shield the target pocket exclusively, making them easier to create and position within the non-gaseous medium. It should be noted that the set of embodiments comprising a solid obstacle can be provided instead of or as well as the shielding comprising the focusing pocket of fluid.

The shielding could comprise a material which is not damaged by the initial shockwave, e.g. the solid obstacle, or it could comprise a material which deforms, moves or breaks. Furthermore, the shielding may only be present within the apparatus on the timescales of the collapse of the focusing and target pockets, for example the shielding could be regenerated before each shockwave is applied to the non-gaseous medium, e.g. along with the creation of the focusing and target pockets. There are a number of different arrangements of the shielding and the focusing and target pockets which are envisaged. For example, the shielding could be located closer to the initial shockwave than the focusing pocket of fluid, or vice versa. In the former example this can allow the target pocket of gas to be positioned closer to the initial shockwave than the focusing pocket of fluid, with the shielding protecting the target pocket from the initial shockwave, but arranged such that the resultant shockwave from the collapse of the focusing pocket is subsequently incident upon the target pocket. In all of the embodiments comprising a solid obstacle, the target pocket of gas could be spaced from or attached to the solid obstacle.

The inventors have appreciated that it is not always necessary to shield the target pocket of gas from the initial shockwave and therefore from a further aspect the invention provides a method of producing a localised concentration of energy comprising:

creating at least one shockwave propagating through a non-gaseous medium, said non-gaseous medium containing a focusing pocket of fluid and a target pocket of gas, such that the shockwave is first incident upon the target pocket of gas;

wherein the target pocket of gas is of different size to the focusing pocket of fluid and the centre of the focusing pocket of fluid is spaced from the centre of the target pocket of gas by less than 1.5 times the diameter of the larger of the focusing pocket of fluid and the target pocket of gas such that the incidence of the shockwave on the focusing pocket of fluid creates a resultant, more intense shockwave which is subsequently incident upon the target pocket of gas.

The invention also extends to an apparatus for producing a localised concentration of energy comprising:

a non-gaseous medium having therein a focusing pocket of fluid and a target pocket of gas;

means for creating at least one shockwave propagating through said non-gaseous medium so as first to be incident upon said target pocket of gas; and wherein the target pocket of gas is of different size to the focusing pocket of fluid and the centre of the focusing pocket of fluid is spaced from the centre of the target pocket of gas by less than 1.5 times the diameter of the larger of the focusing pocket of fluid and the target pocket of gas such that the incidence of the shockwave on the focusing pocket of fluid creates a resultant, more intense shockwave which is subsequently incident upon the target pocket of gas.

The recital of the diameter of the larger of the focusing pocket of fluid and the target pocket of gas does not necessarily imply that the bubbles are spherical, or indeed circular in cross-section. If one or both of the focusing pocket of fluid and the target pocket of gas are not spherical or circular in cross-section, the diameter refers to the equivalent dimension of the pocket shape, e.g. the diameter of the smallest sphere which encloses the pocket.

Although the arrangement of these aspects of the invention does not allow the target pocket of gas to be shielded from the shockwave by the focusing pocket of fluid as in the previous aspects of the invention, counter-intuitively the inventors have found this arrangement to result in advantageous phenomena. When the shockwave is created in the non-gaseous medium, the shockwave compresses the target pocket, upon which it is first incident, before being incident upon the focusing pocket. The resultant intensified shockwave from the focusing pocket then moves outwards and interacts with the remains of the target pocket, compressing the gas again, thus generating higher pressures and temperatures within the target pocket.

In these aspects of the invention, the focusing pocket of fluid and target pocket of gas could be any different relative size, but preferably the target pocket of gas is smaller than the focusing pocket of fluid. Preferably the focusing pocket of fluid has a diameter at least 1.5 times the diameter of the target pocket of gas, e.g. 2 times the diameter, e.g. 3 times the diameter, e.g. 5 times the diameter.

This smaller size of the target pocket of gas results in the target pocket of gas, even though it has been compressed by the initial shockwave, being drawn into the transverse jet created when the shockwave is subsequently incident upon the focusing pocket of fluid. As described previously, when the transverse jet impacts on the leeward side of the focusing pocket, a more intense shockwave is generated. The remains of the target pocket of gas, having been carried along by the jet, are then in an ideal position close to this impact to be compressed further by the more intense shockwave, leading to very high pressures and temperatures in this gas. Preferably the centre of the focusing pocket of fluid is spaced from the centre of the target pocket of fluid by less than 2.5 times the radius of the larger of the focusing pocket of fluid and the target pocket of gas, e.g. less than twice the radius, e.g. less than 1.5 times the radius.

Both the focusing pocket of fluid and the target pocket of gas could each comprise one of a number of different shapes. It is not necessary for the focusing and target pockets to comprise the same shape. For example, the pockets could comprise a sphere, a cylinder (with a variety of possible cross-sectional shapes, e.g. a circle, ellipse or rectangle), a toroid, an ellipsoid, a spheroid or a dumbbell shape. A sphere has the advantage that it can hold the maximum amount of fuel, e.g. for nuclear reactions, for its surface area, but in one set of embodiments the focusing pocket of fluid is elongate, e.g. an ellipsoid or a cylinder with an elliptical cross section. Preferably the focusing pocket is elongate in at least a component of the direction from which the shockwave approaches the focusing pocket. A cylindrical pocket, e.g. with its axis running perpendicular to the direction from which the shockwave approaches the focusing pocket, allows the pocket to be punched or drilled out of the non-gaseous medium, which can easily be done if, for example, the non-gaseous medium comprises a gel.

Providing an elongate focusing pocket is particularly advantageous because of the mechanics of the transverse jet formation when the initial shockwave is incident upon it. The transverse jet created when the shockwave in the non-gaseous medium is incident upon the focusing pocket of fluid accelerates from the incident surface of the focusing pocket to its high speed when it impacts the leeward side of the focusing pocket. As the jet travels through the focusing pocket it continues to accelerate as the shockwave converges. Therefore, by providing an elongate focusing pocket which increases the distance between the incident and leeward sides of the focusing pocket, the jet has space to accelerate further, such that it reaches its maximum speed upon impact on the leeward side of the focusing pocket. This allows the maximum amount of energy from the shockwave to be harnessed into the jet and subsequently the impact on the leeward side of the focusing pocket, therefore maximising the intensity of the resultant shockwave from the collapse of the focusing pocket and the subsequent compression and heating of the target pocket of gas. The maximum radius or length of the focusing pocket of fluid is determined by the point at which the transverse jet starts to be become unstable and therefore breaks down into a spray of droplets.

In one set of embodiments a plurality of shockwaves is applied from a plurality of different directions to the non-gaseous medium. In general there may be at least one focusing pocket of fluid for each of the plurality of shockwaves. This enables the collapse of each of the bubbles to create a resultant shockwave which is incident upon the target pocket of gas, though multiple shockwaves may be applied to the non-gaseous medium to be incident upon a single focusing pocket of fluid. Of course there may also be a plurality of target pockets of gas as described above. The means to apply one or more of the plurality of shockwaves could comprise the resultant shockwave from the collapse of one or more focusing pockets of fluid, so it will be appreciated that there is a degree of overlap between these embodiments and the set of embodiments comprising a plurality of focusing pockets of gas. All of these arrangements allow for a more intense collapse of the target pocket of gas and, as with the set of embodiments which comprise a plurality of focusing pockets of fluid, the plurality of shockwaves and the focusing pockets of fluid can be arranged to conform the resultant shockwave to the shape of the target pocket of gas.

In all the embodiments described above it has been assumed that the shockwave is a planar wave applied to the non-gaseous medium. However in one set of embodiments the shockwave is a non-planar shockwave, i.e. the means for applying the shockwave to the non-gaseous medium is arranged to apply a non-planar shockwave to the non-gaseous medium. This can be in addition to, or instead of using the arrangement of the plurality of focusing pockets of fluid to shape the resultant shockwave incident upon the target pocket of gas. In this way, the initial shockwave can be configured to the arrangement of the focusing pocket of fluid, e.g. to conform to its shape, in order to maximise the intensity of the resultant shockwave which is incident upon the target pocket of gas. It will be appreciated that there are many possible arrangements within the scope of this embodiment, particularly in the sets of embodiments comprising a plurality of incident shockwaves and/or a plurality of focusing pockets of fluid.

Although reference has hereto only been made to the focusing and target pockets in the non-gaseous medium, in one set of embodiments the target pocket of gas is attached to a surface. The resultant shockwave from the collapse of the focusing pocket of fluid can then trap and compress the target pocket of gas against the surface, allowing very high temperatures and pressures to be achieved in the compressed pocket of gas. The surface could be flat, but in one set of embodiments the surface comprises a depression shaped so as partially to receive the target pocket of gas. As well providing somewhere to locate the target pocket of gas, the depression can be designed to receive the resultant shockwave whilst trapping a volume of the original target pocket of gas between the impacting shockwave and itself. This causes very substantial energy focussing in the trapped volume of gas. For example, by optimising the shape of the surface depression to receive the shockwave from the focusing pocket of fluid, the peak temperatures can be increased by over an order of magnitude compared to a pocket of gas attached to a planar surface.

In another set of embodiments in which the target pocket of gas is attached to a surface, the surface is shaped to concentrate the intensity of the resultant shockwave which is incident upon the target pocket of gas. The geometry of the surface can be used to control the reflections of the incident shockwave before it reaches the target pocket of gas such that the collapse of the pocket of gas is intensified, for example such that the shockwave incident from the focusing pocket of fluid is more conforming to the surface of the target pocket of gas.

As before, there are many shapes and configurations which the surface might take to provide suitable regions for attaching the target pocket of gas to the surface and the configuration of the surface will determine how the shockwave interacts with it and the shape of the surface relative to the placement and shape of the pocket of gas will determine how the shockwave interacts with the pocket of gas, which it may do so before, simultaneously or after it interacts with the surface. This in turn affects the dynamics of the collapse and hence can increase temperatures and densities that are achievable through compression of the gas by the shockwave. In some embodiments, the peak temperatures can be increased by over an order of magnitude, when compared with a similar shock interacting with an isolated bubble.

The inventors have also realised that a surface can be employed even if the target pocket of gas is not attached to it. In one set of embodiments the second the pocket of gas is spaced from a surface. Preferably the surface is shaped so as at least partially to reflect the resultant shockwave, i.e. from the collapse of the focusing pocket of fluid, in such a way as to direct it onto the target pocket of gas. Thus it will be seen that in this set of embodiments the surface can be used to increase energy concentration in the target pocket of gas by reflecting and/or focussing the shockwave onto it. The arrangement could be such that the shockwave impacts the surface before the pocket of gas, but preferably the incident shockwave interacts with the pocket of gas, causing it to collapse, and subsequently the incident shockwave and/or any of the numerous shockwaves generated by the cavity collapse (the existence of which will be known to those skilled in the art) interact with the surface in such a way that they are reflected back towards the remains of the gas pocket, causing it to be collapsed a second or further times and thus enhancing the heating obtained.

There are many shapes and configurations which the surface might take. The configuration of the surface will determine how the shockwave interacts with it and the shape of the surface relative to the placement and shape of the pocket of gas will determine how the shockwave interacts with the gas pocket, which it may do so before, simultaneously or after it interacts with the surface. This in turn affects the dynamics of the collapse and hence can increase temperatures and densities that are achievable through compression of the gas by the shockwave. In some embodiments, the peak temperatures can be increased by over an order of magnitude, when compared with a similar shock interacting with an isolated bubble.

In most embodiments the focusing pocket of fluid is spaced from the target pocket of gas, allowing the initial shockwave to be incident upon the focusing pocket, causing it to collapse and cause a resultant shockwave to subsequently be incident upon the target pocket. However, in one set of embodiments, the target pocket of gas is in contact with the focusing pocket of fluid. The target pocket of gas could either be attached to or contained within the focusing pocket of fluid. In the latter case, in order for the pocket of gas to retain its contents, either the focusing pocket of fluid comprises a non-gaseous medium (of a different composition to the non-gaseous medium which the focusing pocket itself is within) or the pocket of gas comprises a membrane surface. Having direct contact between the focusing and target pockets allows their relative positions to be controlled easily, and the properties of the fluid in the focusing pocket can be used to focus the initial shockwave onto the target pocket of gas, thus maximising the intensity of the compression of the gas pocket.

In all of the embodiments comprising a surface to which the target pocket of gas is attached or from which the target pocket of gas is spaced, the surface could comprise the inner surface of a container holding the non-gaseous medium. Alternatively the surface could comprise an object positioned at any suitable location within the non-gaseous medium, and indeed can comprise a surface of the shielding, e.g. the solid obstacle.

The aspects of the invention described herein provide alternatives to the technique described in U.S. Pat. No. 7,445,319 which may carry their own benefits. The present inventors have recognised that there are significant challenges in the nucleation of a bubble in a droplet fired at high speed into a target, as suggested in U.S. Pat. No. 7,445,319. The timing will have to be very precise for the bubble to be at a favourable moment of its expand-collapse cycle when the shock strikes. The method by which the high speed droplets are created as required by U.S. Pat. No. 7,445,319 and detailed in U.S. Pat. No. 7,380,918 is also complex and expensive. By contrast such complexity and associated expense can be avoided in accordance with at least preferred embodiments of the present invention. Thus, the various aspects of the present invention provide much simpler techniques for compressing a volume of gas by a jet from a non-gaseous medium, as a shockwave simply needs to be created within the non-gaseous medium. Moreover the theoretical and computer modelling of both techniques carried out by the present inventors suggests that the method in accordance with the present invention can give pressure and temperature intensities which are an order of magnitude greater than the method detailed in U.S. Pat. No. 7,445,319.

The initial shockwave could be created in a number of different ways by a number of different devices depending on the pressure required. For example, an explosive plane wave generator could be used to provide high intensity shockwaves. Alternatively a gas gun could be used to strike a projectile into a diaphragm or piston in contact with the non-gaseous medium to create the shockwave. In preferred embodiments such an explosive device can create a shockwave pressure of between 0.1 GPa and 50 GPa. If a shockwave is to be repeatedly applied to the non-gaseous medium, the repetition rate might be greater than 0.1 Hz, e.g. greater than 1 Hz, e.g. greater than 10 Hz, e.g. greater than 100 Hz, e.g. greater than 1 kHz, e.g. 20 kHz.

The Applicant notes that the scope of the present invention does not extend to the shockwave comprising an ultrasound shockwave and thus being created by a device that generates ultrasound shockwaves, e.g. a lithotripsy device. Thus the scope of the present invention does not include the pocket of gas being collapsed through the process of sonoluminescence.

The term "gas" as used herein should be understood generically and thus not as limited to pure atomic or molecular gases but also to include vapours, suspensions or microsuspensions of liquids or solids in a gas or any mixture of these. The "non-gaseous medium" should be understood generically and thus could include liquids, non-Newtonian liquids, semi-solid gels, materials that are ostensibly solid until the passage of the shockwave changes their properties, suspensions or micro-suspensions and colloids. Examples include but are not limited to water, oils, solvents such as acetone, hydrogels and organogels. The term "fluid" should be understood generically and thus could include any form of non-solid, e.g. encompassing all the compositions discussed above for "gas" and "non-gaseous", and also including liquids and non-Newtonian liquids. It should be understood that the non-gaseous medium will have a greater density than the gas and generally also than the fluid. However, the relative densities of the fluid in the focusing pocket and the gas in the target pocket are not predetermined in this way, particularly in those embodiments in which the fluid comprises a gas, e.g. the fluid in the focusing pocket could be less dense than the gas in the target pocket.

The non-gaseous medium could be any suitable substance for creating a shockwave in, such as a liquid or a semi-solid gel. The gas and fluid pockets can then be provided by a bubble or droplet suspended within the liquid or gel medium in the required locations. Using a gel or a viscous liquid has the advantage that it is easier to control the location of the gas and fluid pockets within the medium, compared to a lower viscosity liquid in which the buoyancy of the bubble may overcome the viscosity of the liquid. As will be appreciated, being able to control the position of the pockets is particularly important in the set of embodiments in which the gas pocket is located near to a surface rather than being attached to it. In the set of embodiments in which the gas pocket is attached to the surface, the nature of the surface, e.g. the material, or any indentations or depressions in it, could help to adhere the gas pocket to the surface. Using a gel or viscous liquid also has the advantage that it will be easier to control the detailed shape of the gas and fluid pockets.

Owing to the more static nature of the setup of the device when compared to U.S. Pat. No. 7,445,319, much more control can be exercised over the shape of the bubble, as discussed above. In the set of embodiments where the bubble is attached to the surface, it may be spherical in shape apart from where it is truncated by its attachment to the target surface, for example it could be hemi-spherical. In some embodiments the bubble joins the target surface normal to it whereas in others a different angle is required. In a superset of these embodiments the bubble itself is not spherical in nature but takes a different shape that includes but is not limited to ellipsoids, cardioids, variations from spherical, cardioid or ellipsoid shape in which the surface has perturbations that could be described, for example, by a Fourier series and bubbles with other distinct shapes such as cones or trapezoids. It will be apparent that, for example, a conical bubble would be difficult to achieve in a true liquid medium but that in the case of a gel medium this set of embodiments becomes possible and could be advantageous. In the embodiments of the invention in which the bubble is not attached to the surface, it is free from the constraints of the surface and is therefore able to take any shape required as discussed above. In a set of such embodiments the shape of the bubble and the shape of the target surface can be appropriately matched, e.g. if the depression is hemispherical, the bubble would be spherical.

The gas and fluid pockets themselves must be formed in some manner. In a particular set of embodiments they are nucleated using a system similar to that described in U.S. Pat. No. 7,445,319, where a laser is used in conjunction with nano-particles in the liquid to nucleate a pocket of gas or fluid. In a different set of embodiments a gas or fluid pocket could be nucleated using an unstable emulsion of different liquids. In another set of embodiments the pockets are nucleated using an appropriately targeted pressure wave designed to induce cavitation in the liquid. It is not required that all the pockets be nucleated simultaneously, they may be created with different relative timings. In one set of embodiments the target pocket may be nucleated after the collapse of the focusing pocket, for example in a region of the non-gaseous medium through which the shockwave has already traversed. In the set of embodiments where the gas pocket is attached to the wall, a specifically controlled volume of gas could be pumped in through a passage in the target surface in order to expand a bubble on the surface. This set of embodiments has the advantage of great control over the contents and size of the gas pocket generated. In the set of embodiments where the liquid medium is a gel the gas pocket can be pre-manufactured by punching or otherwise cutting out or moulding the correct shape from the gel block to be used.

In another set of embodiments the gas and/or fluid pockets are formed with the use of a pre-manufactured membrane that defines the boundary between the gas or fluid pocket and the non-gaseous medium and hence also defines the pocket's shape. The use of a thin membrane in this manner allows a decoupling of the non-gaseous and gas or fluid materials, allowing any choice of combination of compositions to be made. It also allows the shapes of the pockets to be controlled with a precision not available to other methods. The membrane could be formed from any suitable material, e.g. glass, plastic or rubber. Having a prefabricated membrane allows a liquid medium to be used more easily as the non-gaseous medium as the volume of gas is trapped, e.g. against the surface and therefore cannot float away or be otherwise disturbed. In a particular set of embodiments the membrane is frangible and is arranged to break upon impact from the shockwave. In one set of embodiments the prefabricated membrane includes a line or region of weakness, so that upon impact from the shockwave it breaks along the line or in the region of weakness. The line or region of weakness can be arranged so that the position of the breach has an influence on the ensuing flow patterns, for example this could help control the formation and dynamics of the transverse jetting. In another set of embodiments the membrane is designed to deform with the collapsing cavity. In the set of embodiments where the gas pocket is not attached to the surface, the concept of a gas or fluid pocket contained within a membrane is also useful. In a particular set of embodiments the gas or fluid pockets take the form of small glass beads filled with an appropriate gas or fluid. This has the same advantage of giving control over the shape of the gas pocket.

In a preferred set of embodiments, the methods described herein are employed to generate nuclear fusion reactions. The fuel for the reaction could be provided by any one or more of the non-gaseous medium, the fluid in the focusing pocket, the gas in the target pocket, and/or the fuel could be provided by the surface itself, i.e. not all the focusing and/or target pockets may contain fuel. Any of the fuels mentioned in U.S. Pat. No. 7,445,319 is suitable for use in the present invention. In the set of embodiments comprising multiple focusing and/or target pockets, the fuel could be the same in all the pockets. Alternatively, different focusing and/or target pockets could comprise different compositions of fuel (or simply just different compositions of gas or fluid when not a fuel), e.g. to affect the collapse times, strength, and/or direction of the resultant shockwaves. In the set of embodiments which comprise a target pocket of gas attached to a surface, preferably the surface comprises a fuel. This is advantageous because this is where the compression of the respective target pocket of gas takes place and so the pressures and temperatures created upon its compression will also be very high in the adjacent surface.

In one set of embodiments the focusing pocket(s) of fluid and the target pocket(s) of gas are of different compositions, e.g. the target pocket(s) of gas could contain fuel and the focusing pocket(s) of fluid could contain an inert fluid. This is considered novel and inventive in its own right and therefore when viewed from a further aspect the invention provides a method of producing a localised concentration of energy comprising:

creating at least one shockwave propagating through a non-gaseous medium so as first to be incident upon a focusing pocket of fluid within the medium;

wherein the focusing pocket of fluid is of different composition to the target pocket of gas and is positioned relative to a target pocket of gas within the medium such that the incidence of the shockwave on the focusing pocket of fluid concentrates the intensity of a shockwave subsequently incident upon the target pocket of gas.

The invention also extends to an apparatus for producing a localised concentration of energy comprising:

a non-gaseous medium having therein a focusing pocket of fluid and a differently sized target pocket of gas;

means for creating at least one shockwave propagating through said non-gaseous medium so as first to be incident upon said focusing pocket of fluid;

wherein the focusing pocket of fluid is of different composition to the target pocket of gas and is positioned relative to the target pocket of gas within the medium such that the incidence of the shockwave on the focusing pocket of fluid concentrates the intensity of the shockwave subsequently incident upon the target pocket of gas.

As discussed above, preferably the target pocket contains fuel, e.g. for nuclear fusion reactions. Furthermore, all the features discussed in relation to all the previous aspects of the invention are equally applicable to this aspect and other aspects of the invention. For example, in one set of embodiments the focusing pocket of fluid is arranged to shield the target pocket of gas from the initial shockwave.

The device in the present invention is not as restricted, regarding size, as U.S. Pat. No. 7,445,319 where the size of the droplet constrains the maximum size of the trapped bubble. It may be advantageous to have a larger apparatus where a larger volume of gas is compressed and heated. The volume of gas or fluid in each of the focusing and target pockets may be chosen depending on the circumstances but in one set of preferred embodiments it is between $5\times10^{-11}$ and $5\times10^{-3}$ liters.

The fusion reactions which can be obtained in accordance with certain embodiments of the invention could be used for net energy production (the long term research aim in this field), but the inventors have appreciated that even if the efficiency of the fusion is below that required for net energy production, the reliable fusion which is obtainable in accordance with embodiments of the invention is advantageous for example in the production of tritium which can be used as fuel in other fusion projects and is very expensive to produce using currently existing technologies, e.g. using a nuclear fission reactor. The fusion can also be beneficial in giving a fast and safe neutron source that is cheaper and more compact than conventional alternatives. Those skilled in the art will appreciate that this has many possible applications, e.g. shipping container scanning to name one.

Moreover, it is not essential in accordance with the invention to produce fusion at all. For example, in some embodiments the techniques and apparatus of the present invention may be advantageously employed as an exotic chemistry reactor which can be used to access extreme and unusual conditions, or simply to produce substantial heating particularly which is localised in its concentration.

BRIEF DESCRIPTION OF THE DRAWINGS

Certain embodiments of the invention will now be described, by way of example only, with reference to the accompanying drawings, in which:

FIGS. 2a-2e show five successive stages of an interaction of a shockwave with the pockets of fluid and gas shown in FIG. 1;

FIG. 4 shows a variant of the embodiment of FIG. 1 comprising elongate pockets of gas;

FIGS. 14a-14d show four successive stages of an interaction of a shockwave with the pockets of fluid and gas shown in FIG. 13;

FIGS. 16a-16d show four successive stages of an interaction of a shockwave with the pockets of fluid and gas shown in FIG. 15;

DETAILED DESCRIPTION

Figure 1:
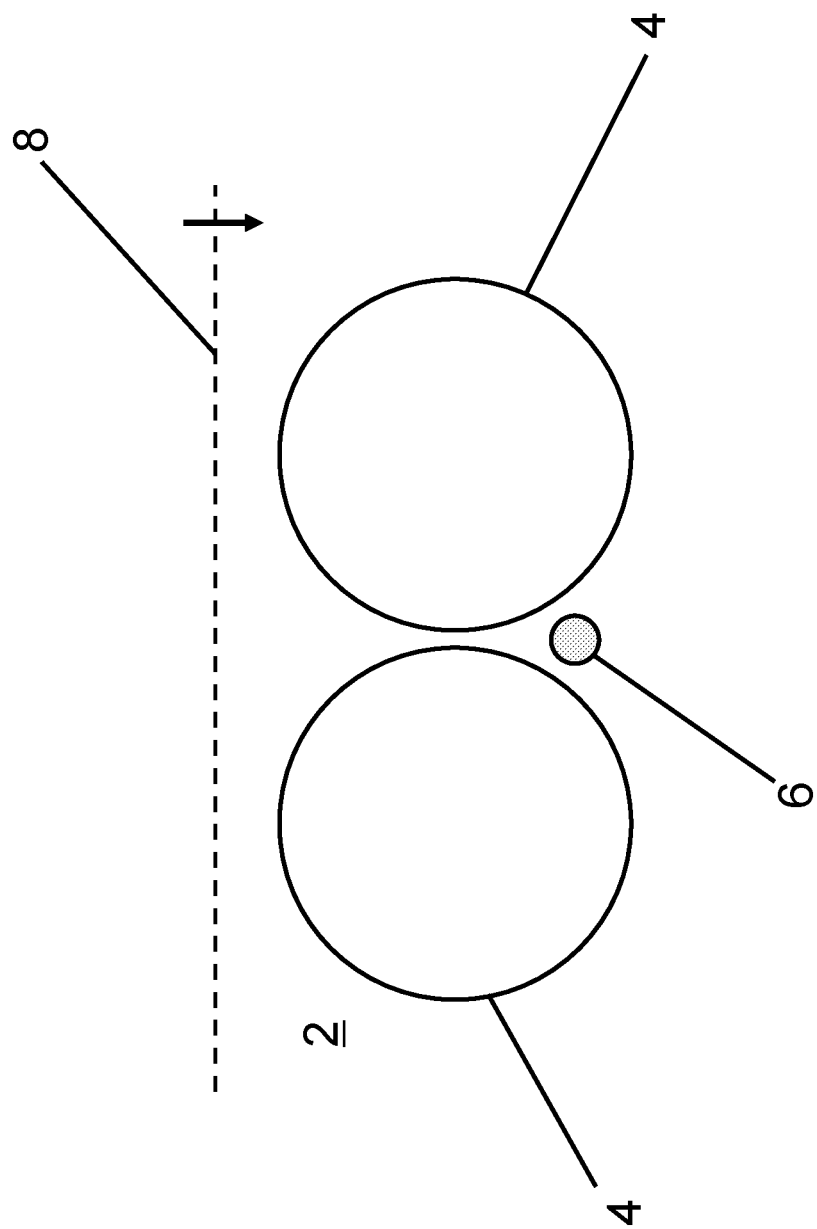
FIG. 1 shows an embodiment in accordance with the invention.

FIG. 1 shows schematically an arrangement in accordance with the invention. A non-gaseous medium 2 in the form of a hydrogel, for example a mixture of water and gelatine, is provided within which two focusing pockets of fluid 4 and a target pocket of gas 6 are defined and immobilised. The target pocket of gas 6 could be a vaporous fuel suitable for taking part in a nuclear fusion reaction, for example. The size of the apparatus is flexible but a typical dimension of this diagram could be between 0.1 and $1 \times 10^{-5}$ m.

The operation of this embodiment will now be described, with particular reference to the five successive stages shown in FIGS. 2a-2e of a shockwave 8 interacting with the focusing pockets of fluid 4 and the target pocket of gas 6. Initially, a shockwave 8 is created from an explosion, for instance with a pressure of 5 GPa, within the non-gaseous medium 2. This is represented in FIGS. 1 and 2a as a line propagating in the direction of the arrow towards the focusing pockets of fluid 4.

The shockwave 8 is incident first upon the upper parts of the focusing pockets of fluid 4, as shown in FIG. 2b, causing a portion of the shockwave 8 to be reflected as a result of the large change in density from the non-gaseous medium 2 to the fluid in the focusing pockets 4. This reflected portion forms a rarefaction fan 5 which propagates away from the focusing pockets of fluid 4 and therefore creates a low pressure region between the reflected portion of the shockwave and the focusing pockets of fluid 4. The combination of the rarefaction fans from the two focusing pockets of fluid 4 creates a resultant area of shielding 10 in the non-gaseous medium, which prevents the shockwave propagating through the gap between the focusing pockets of fluid 4, and becoming incident upon the target pocket of gas 6 at this stage.

The non-gaseous medium 2 flows into the low pressure region between the reflected portion of the shockwave and the pockets of fluid 4 as two transverse jets 12 which then traverse the focusing pockets of fluid 4, as shown in FIG. 2c. The jets 12 accelerate across the volume of the focusing pockets of fluid 4 until they impact on the leeward surface of the focusing pockets of fluid 4. These impacts create resultant shockwaves 14, as can be seen in FIG. 2d, which travel outwards from the collapsed focusing pockets of fluid 4 and which are more intense than the initial shockwave 8 applied to the non-gaseous medium 2. These resultant shockwaves, as well as shockwaves from the subsequent collapse of the remaining portions of the focusing pockets of fluid 4 are incident upon the target pocket of gas 6, as shown in FIG. 2e. This compresses the gaseous fuel inside the target pocket of gas 6, causing intense local heating which can be sufficient to generate a nuclear fusion reaction.

Figure 3B:
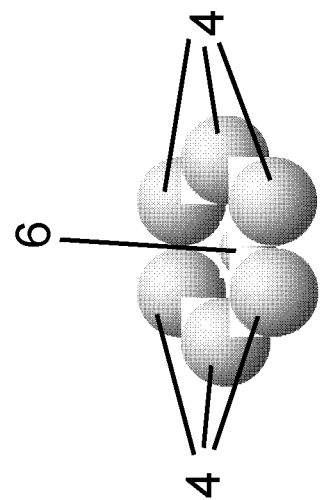
FIGS. 3a-3d show different possible symmetry configurations of the embodiment shown in FIG. 1.
Figure 3D:
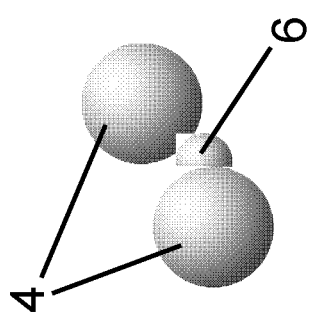
Figure 3A:
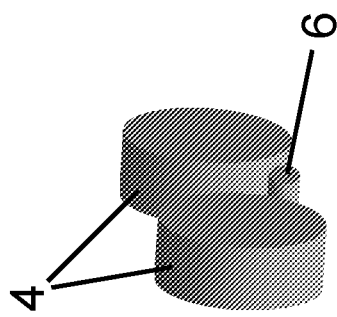

A number of different symmetrical configurations of the embodiment shown in FIG. 1 are shown in FIGS. 3a-3d. In the embodiment shown in FIG. 1 and in each of the embodiments described below, the diagrams shown are a vertical cross-section through a three-dimensional volume of the focusing pockets of fluid 4 and target pocket of gas 6, and hence they depict embodiments that are rotationally symmetric, as shown in FIG. 3a, i.e. the focusing pockets of fluid 4 form a toroid. However, this is not essential to the invention. For example, as shown in FIG. 3b, the focusing pockets of fluid 4 and target pocket of gas 6 could comprise cylinders with a circular cross section. This design can be advantageous in that it allows the pockets to be punched out of the non-gaseous medium 2, avoiding the need for any nucleation.

Figure 3C:
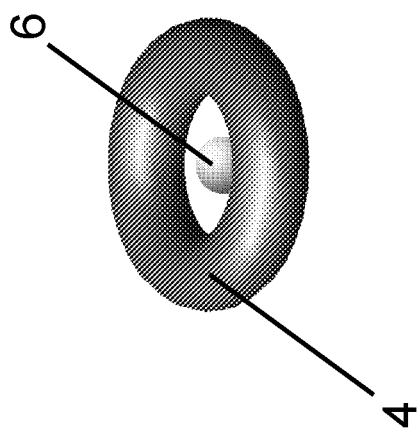

The arrangement shown in FIG. 3c comprises two spherical focusing pockets of fluid 4 arranged on either side of the target pocket of gas 6 in a two-dimensional plane, and FIG. 3d shows a fully three-dimensional configuration of six spherical focusing pockets of fluid 4 arranged around the target pocket of gas 6. An arbitrary arrangement could be provided which still has some rotational symmetry. The operation of these arrangements is similar to that described above for the embodiment shown in FIG. 1, i.e. with reference to FIGS. 2a-2e.

FIG. 4 shows a variant of the embodiment shown in FIG. 1, in which the focusing pockets of fluid 104 within the non-gaseous medium 102 are elongate, e.g. with an elliptical cross section. This configuration, while still providing the shielding effect to the target pocket of gas 106, gives the transverse jet, created on impact of the shockwave 108 upon the focusing pockets of fluid 104 as described above with reference to FIGS. 2a-2e, more time to accelerate across the volume of the pockets of fluid 104. Therefore the transverse jet reaches a higher speed when it impacts against the leeward surface of the focusing pockets of fluid 104, creating more intense resultant shockwaves which are subsequently incident upon the target pocket of gas 106, resulting in greater pressures and temperatures being obtained within the compressed target pocket of gas 106.

Figure 5:
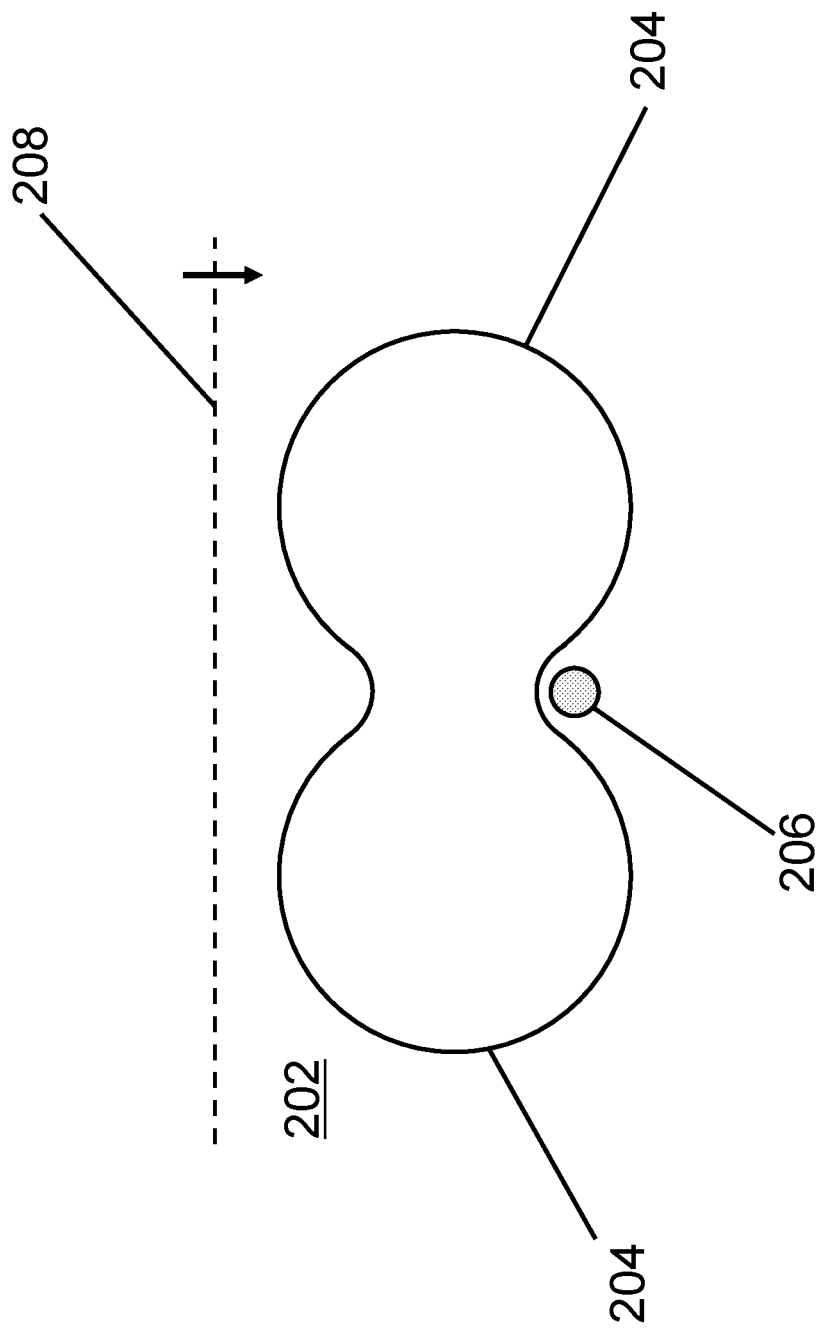
FIG. 5 shows a variant of the embodiment of FIG. 1 comprising a dumbbell shaped pocket of fluid.

FIG. 5 shows another variant of the embodiment shown in FIG. 1, in which the pockets of fluid 204 are joined together to form a single dumbbell shaped focusing pocket of fluid 204 within the non-gaseous medium 202. This can be seen to provide a good shielding effect from the initial shockwave 208 for the target pocket of gas 206.

Figure 6:
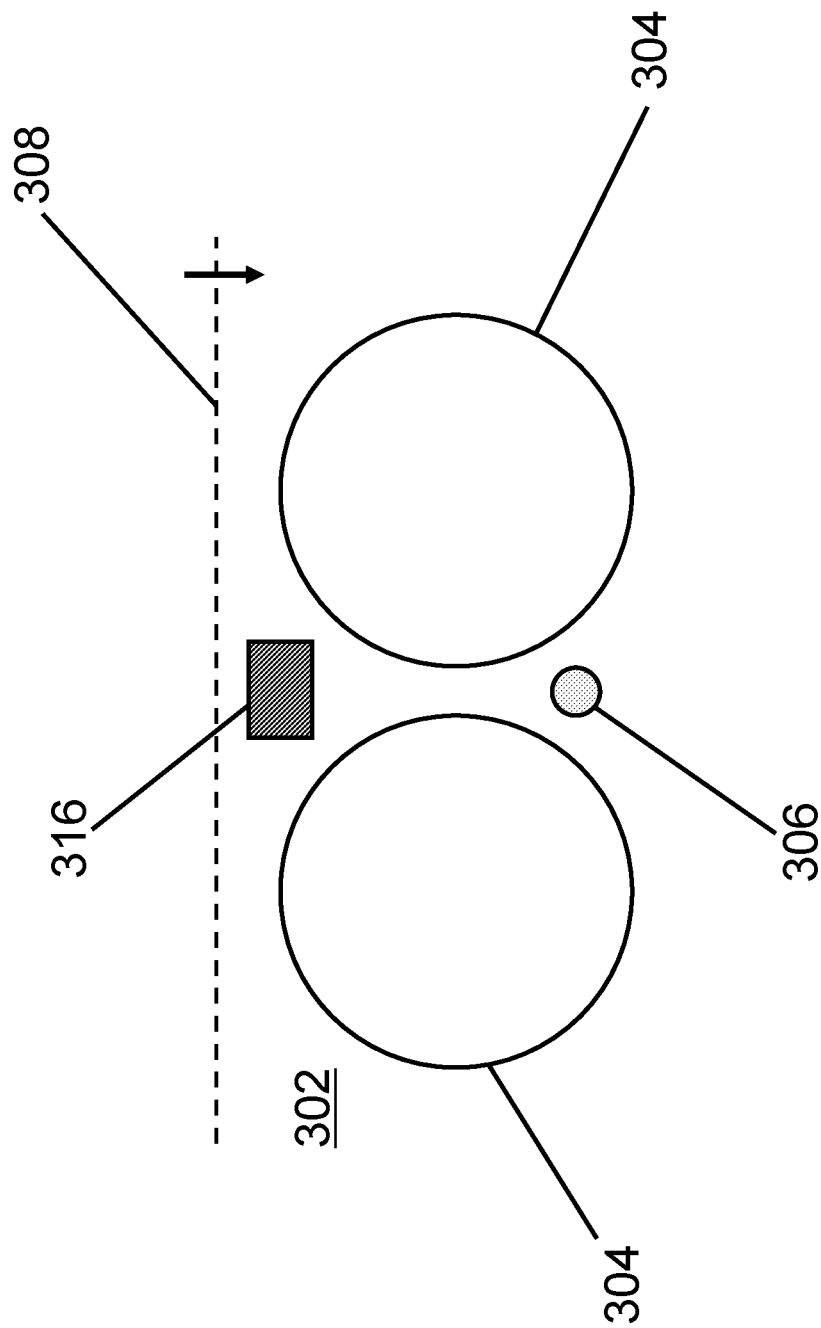
FIG. 6 shows a variant of the embodiment of FIG. 1 comprising an immovable obstacle.

FIG. 6 shows a further variant of the embodiment shown in FIG. 1, in which an immovable solid obstacle 316 is positioned within the non-gaseous medium 302 above and between the focusing pockets of fluid 304. The immovable solid obstacle 316 provides shielding from the initial shockwave 308 for the target pocket of gas 306, allowing the focusing pockets of fluid 304 to be positioned further away from each other than in previous embodiments. This can make it easier to form and position the focusing pockets of fluid 304 within the non-gaseous medium 302.

Figure 7:
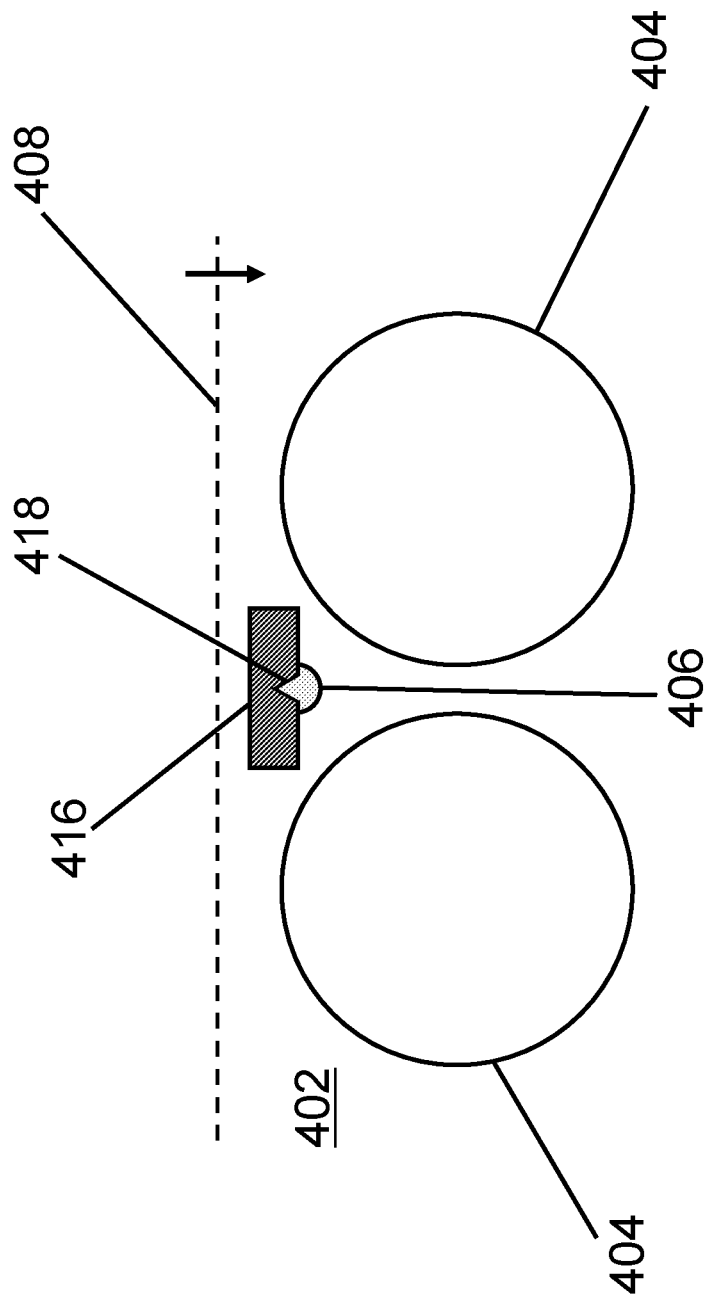
FIG. 7 shows a variant of the embodiment of FIG. 2.

FIG. 7 shows a variant of the embodiment shown in FIG. 6, in which the target pocket of gas 406 is attached to the underside of the immovable solid obstacle 416, i.e. the side opposite the direction of the initial shockwave 408, so as to cover and fill a V-shaped tapering depression 418. As in FIG. 6, the immovable solid obstacle 416 provides shielding from the initial shockwave 408 for the target pocket of gas 406, and in this embodiment also provides a surface against which the target pocket of gas 406 can be trapped and compressed by the resultant shockwave from the collapse of the two focusing pockets of fluid 404.

Indeed the incidence of the resultant shockwave upon the target pocket of gas 406 can, in some embodiments, result in a further transverse jet of the non-gaseous medium 402 being formed which traverses the target pocket of gas 406 such that a portion of the target pocket of gas 406 is trapped between the tip of the jet and the tapering depression 418 in the surface of the immovable solid obstacle 416. This impact of the transverse jet against the surface of the immovable solid obstacle 416 can both cause intense heating and compression of the target pocket of gas 406 as well as a shockwave in the immovable solid obstacle 416. Therefore if the immovable solid obstacle 416 comprises fuel or reactants, this can trigger the desired reaction in the material of the immovable solid obstacle 416.

Figure 8:
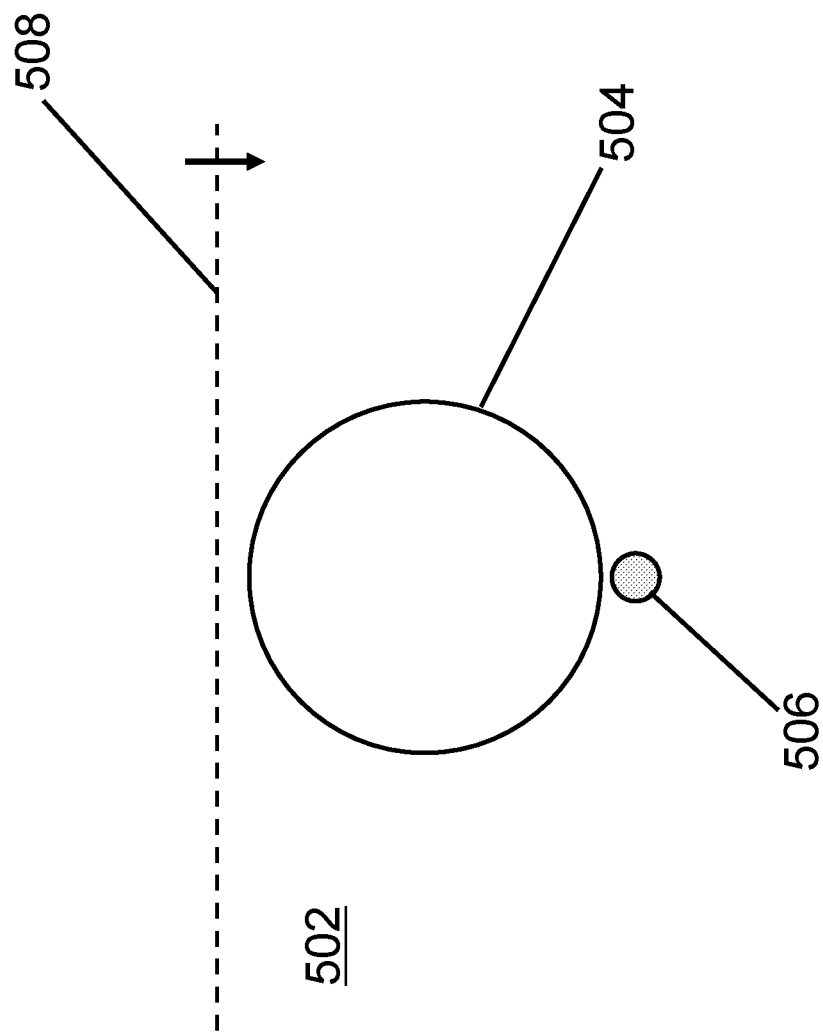
FIG. 8 shows a variant of the embodiment of FIG. 1 with a single pocket of fluid.

FIG. 8 shows yet another variant of the embodiment shown in FIG. 1, in which only a single focusing pocket of fluid 504 is provided within the non-gaseous medium 502. The operation is very similar to that of the embodiments described above, with the transverse jet created when the shockwave 508 is incident upon the focusing pocket of fluid 504 creating a resultant shockwave when the jet impacts on the on the leeward wall of the focusing pocket of fluid 504. This resultant shockwave then acts to compress the target pocket of gas 506 as described above, the target pocket of gas 506 having initially been shielded by the focusing pocket of fluid 504 from the initial shockwave 508.

Figure 9:
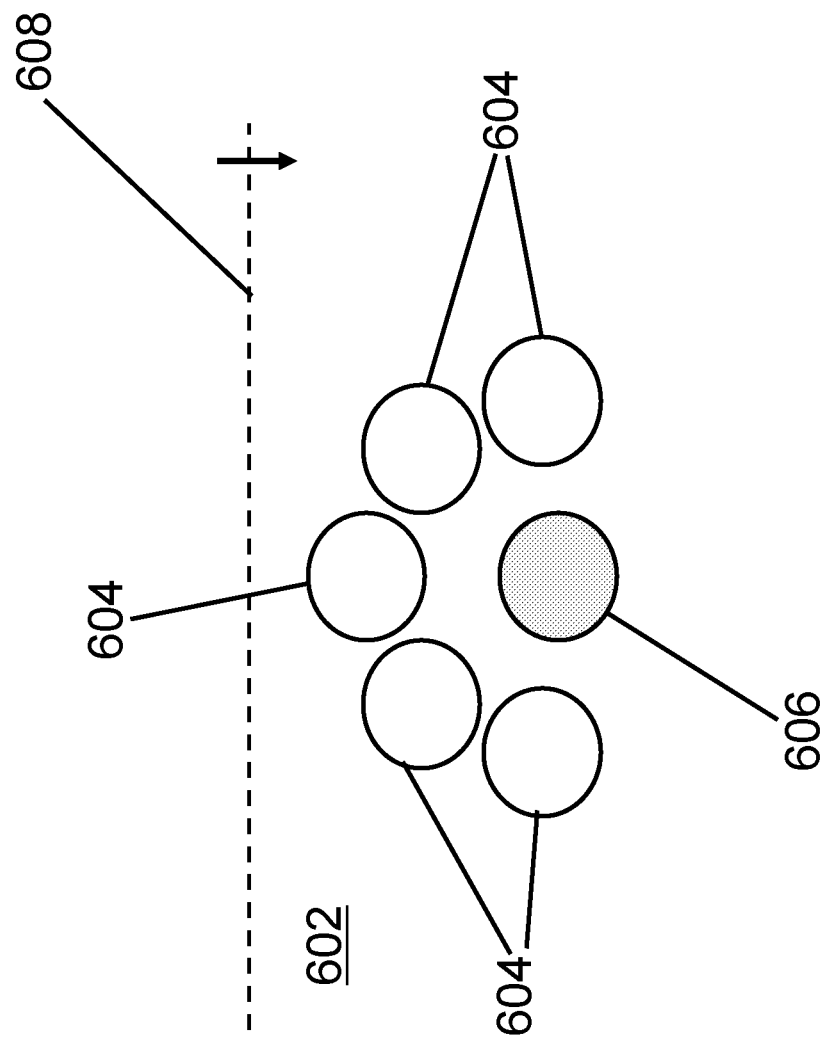
FIG. 9 shows a variant of the embodiment of FIG. 1 with an array of pockets of fluid.

FIG. 9 shows a variant of the embodiment shown in FIG. 1, in which an array of focusing pockets of fluid 604 are positioned within the non-gaseous medium 602 above and around the target pocket of gas 606. These focusing pockets of fluid 604 are positioned, and/or contain different compositions of fluid, such that their collapse results in shockwaves which are incident simultaneously upon and conform to the shape of the target pocket of gas 606, thus creating a very intense compression of the target pocket of gas 606. Alternatively, the position and composition of the focusing pockets of fluid 604 can be such that their collapse results in shockwaves which are incident at slightly different times resulting in repeated compression of the target pocket of gas 606.

Figure 10:
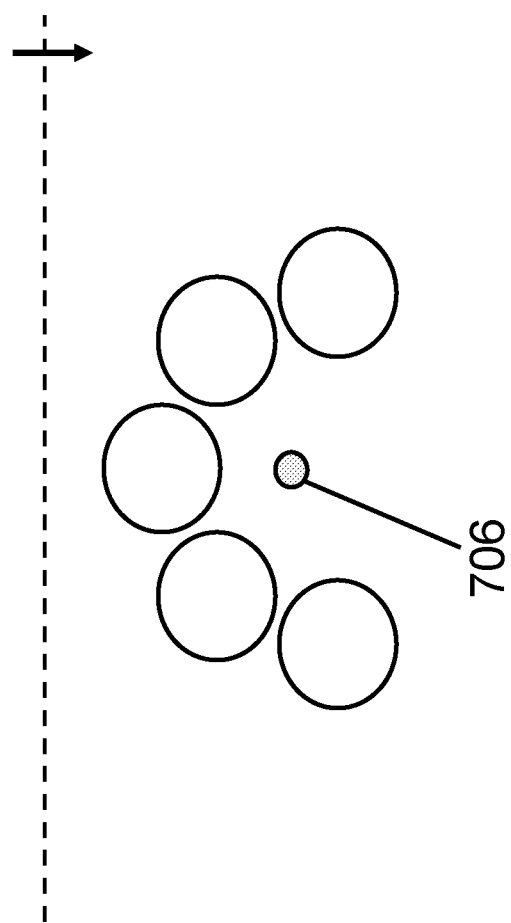
FIG. 10 shows a variant of the embodiment of FIG. 9 with a smaller pocket of gas.

FIG. 10 shows a variant of the embodiment shown in FIG. 9, in which a much smaller target pocket of gas 706 is provided. This smaller target pocket of gas 706 allows a much greater intensity of pressure and temperature to be obtained, as the energy from the shockwave is concentrated over a much smaller volume.

Figure 11:
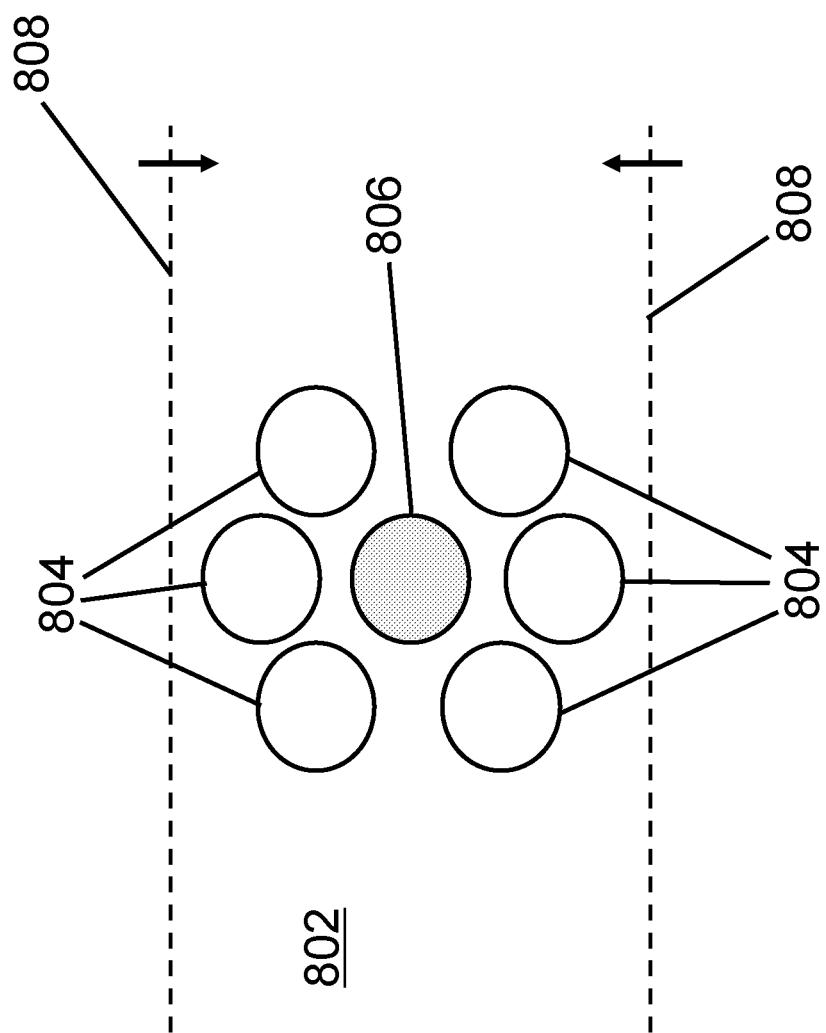
FIGS. 11 and 12 show variant of the embodiment of FIG. 9 with multiple initial shockwaves.

FIG. 11 shows another variant of the embodiment shown in FIG. 9, in which two arrays of focusing pockets of fluid 804 are positioned above and below the target pocket of gas 806 within the non-gaseous medium. The apparatus is arranged such that two shockwaves 808 are created within the non-gaseous medium 802 and which approach the focusing pockets of fluid 804 from above and below in opposite directions. This results in the collapse of the arrays of focusing pockets of fluid 804, creating resultant shockwaves which are subsequently incident upon the target pocket of gas 806. The resultant shockwaves from opposite directions increase the compression of the target pocket of gas 806 in the manner described above. In a variation of this embodiment, the shockwaves 808 can be created in the non-gaseous medium 802 such that they are incident upon one of the arrays of pockets of fluid 804 before the other. This results in the resultant shockwaves being incident upon the target pocket of gas 806 one after the other.

Figure 12:
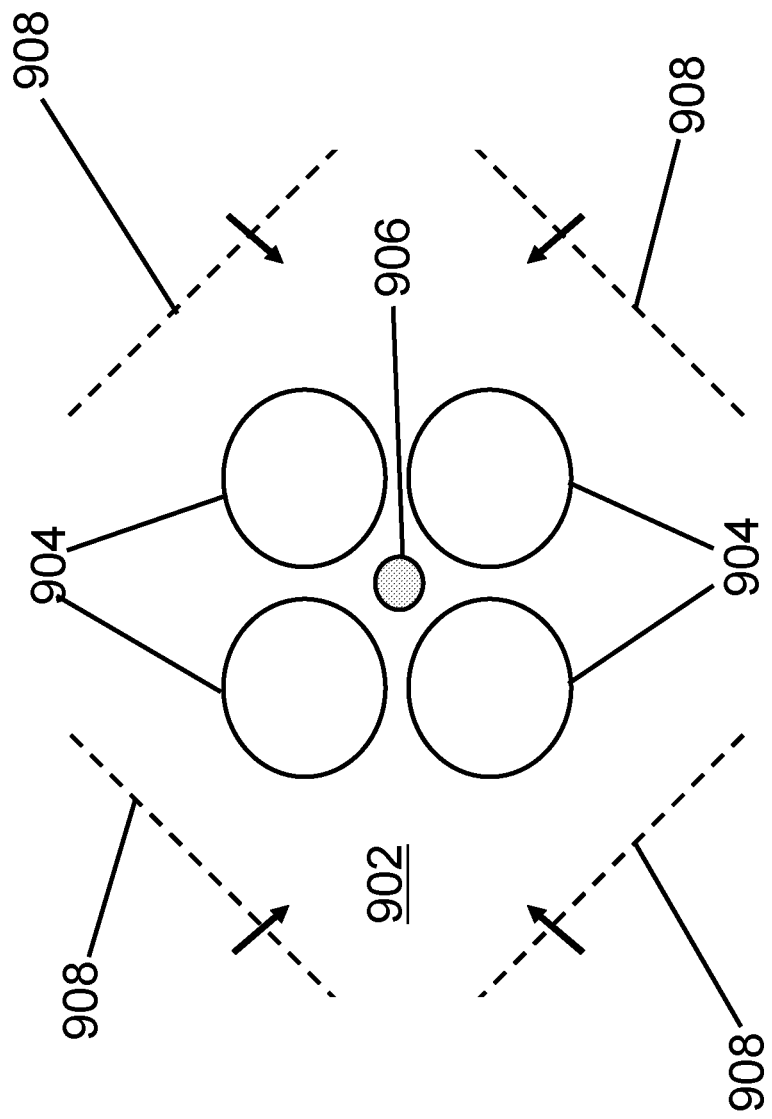

FIG. 12 shows a variant of the embodiment shown in FIG. 11, in which four focusing pockets of fluid 904 are positioned around the pocket of gas 906. The apparatus is arranged such that four shockwaves 908 are created within the non-gaseous medium 902 and which approach the focusing pockets of fluid 904 from the side opposite to that facing the target pocket of gas 906. Each of these shockwaves 908 causes the collapse of the respective focusing pocket of fluid 904 upon which it is incident, with the resultant shockwaves converging on the target pocket of gas 906, causing it to be compressed and heated as described above.

Figure 13:
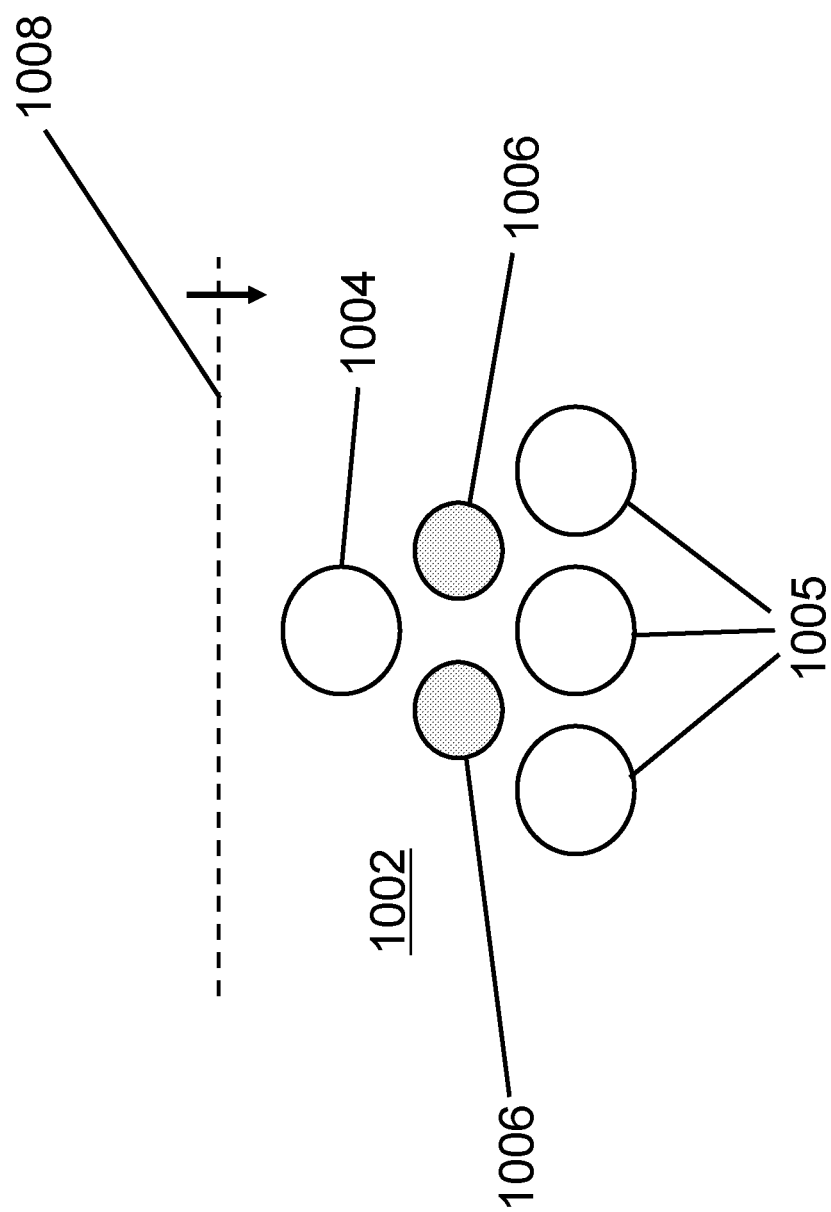
FIG. 13 shows a variant of the embodiment of FIG. 1 with two pockets of gas and two layers of pockets of fluid.

FIG. 13 shows a variant of the embodiment shown in FIG. 1, in which two pockets of gas 1006 and two layers of focusing pockets of fluid 1004, 1005 are provided within the non-gaseous medium 1002. A single shockwave 1008 is generated within the non-gaseous medium such that it propagates towards the focusing pocket of fluid 1004 in the upper layer, as is also shown in FIG. 14*a*. The incidence of the shockwave 1008 upon the upper focusing pocket of fluid 1004 causes its collapse and the production of a resultant shockwave 1014, as described with reference to above embodiments and illustrated in FIG. 14*b*. This resultant shockwave is subsequently incident upon the two target pockets of gas 1006, resulting in the creation of transverse jets 1012 which impact against the leeward wall of the target pockets of gas 1006. These impacts cause further resultant shockwaves 1015 which emanate from the target pockets of gas 1006 and are incident upon the lower layer of focusing pockets of fluid 1005, as shown in FIG. 14*c*. In the same manner, these focusing pockets of fluid 1005 collapse, resulting in further resultant shockwaves 1017 which are subsequently incident upon the remnants of the target pockets of gas 1006, as shown in FIG. 14*d*. This compresses the target pockets of gas 1006 further, increasing the pressure and temperature obtained within them.

As with the arrangements shown in FIGS. 9-12, any number of pockets of fluid and pockets of gas can be provided in any configuration. Furthermore, any number of shockwaves from any chosen direction can be generated within the non-gaseous medium to be incident upon the pockets of fluid.

Figure 15:
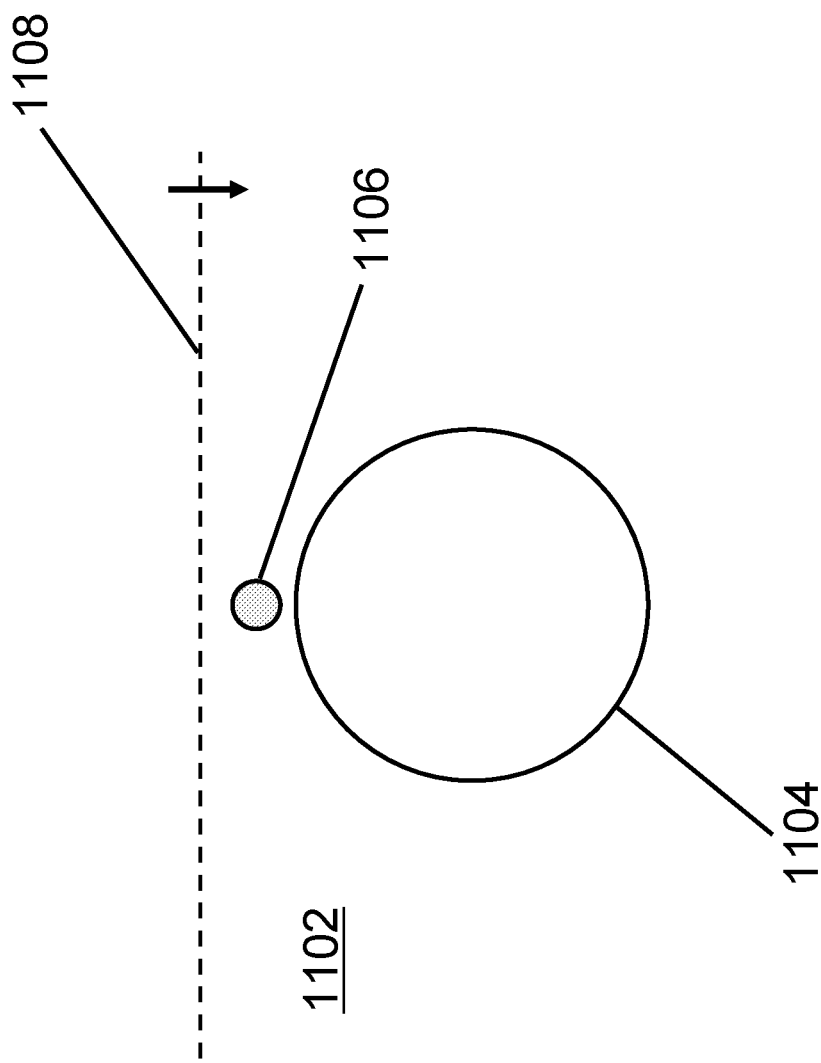
FIG. 15 shows a variant of the embodiment of FIG. 8 with the pocket of gas above the pocket of fluid.

FIG. 15 shows a variant of the embodiment shown in FIG. 8, in which the configuration is reversed with respect to the initial shockwave 1108 with the target pocket of gas 1106 above the focusing pocket of fluid 1104. As shown in FIG. 16*a* an initial shockwave 1108 is generated within the non-gaseous medium 1102 in a direction towards the pocket of gas 1106, upon which it first is incident. However, as the target pocket of gas 1106 is small compared to the focusing pocket of fluid 1104, the initial shockwave 1108 is not disturbed much by its incidence upon the target pocket of gas 1106. Therefore when the shockwave 1108 is subsequently incident upon the focusing pocket of fluid 1104 as shown in FIG. 16*b*, it causes the collapse of the focusing pocket of fluid 1104 in the same manner as has already been described, i.e. a transverse jet 1112 of the non-gaseous medium 1102 is formed which traverses the focusing pocket of fluid 1104. However, in this embodiment the target pocket of gas 1106 is positioned sufficiently close to the focusing pocket of fluid 1104 such that the collapsed remnant of the target pocket of gas 1106 is drawn into the transverse jet 1112, as shown in FIG. 16*c*. With the same mechanism as previously described, the transverse jet 1112 impacts against the leeward wall of the focusing pocket of fluid 1104, as shown in FIG. 16*d*, causing a resultant shockwave 1114 to move outwards from the point of impact. As the collapsed remnant of the target pocket of gas 1106 has been drawn across the focusing pocket of fluid 1104 in the transverse jet 1112, it is ideally positioned to have the resultant shockwave 1114 incident upon it while the resultant shockwave 1114 at its most intense, i.e. before the resultant shockwave 1114 dissipates.

Figure 17:
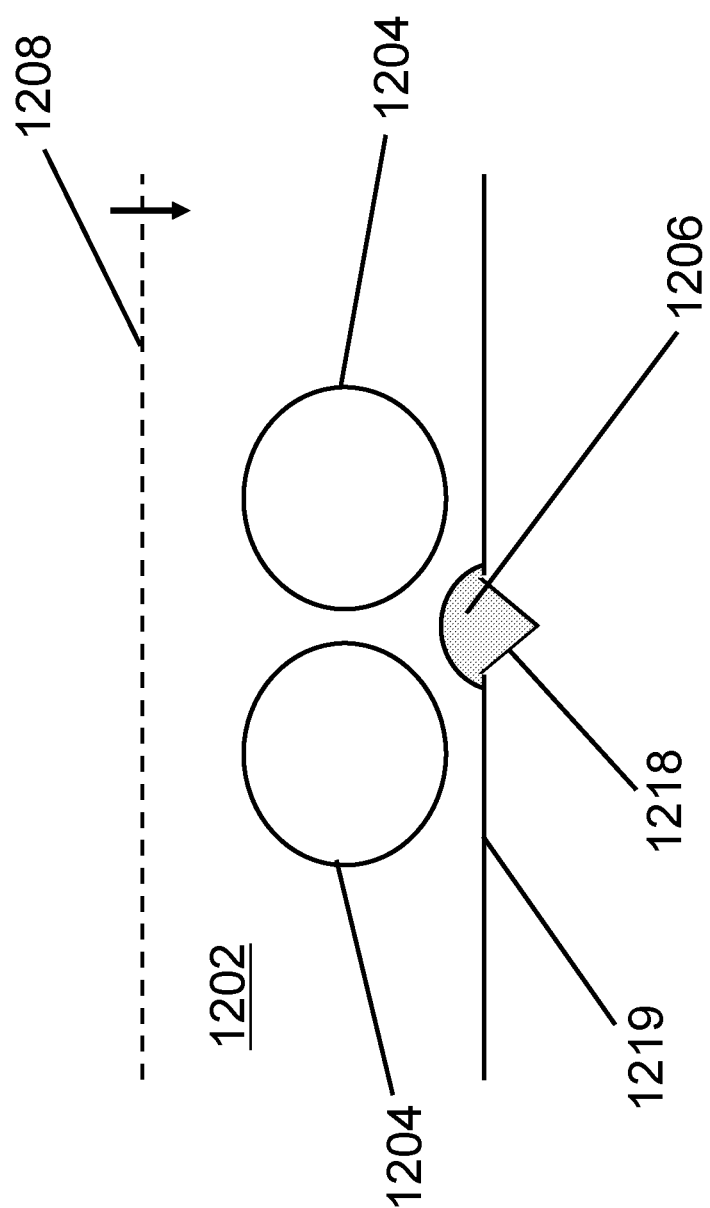
FIG. 17 shows a variant of the embodiment of FIG. 1 in which the pocket of gas is attached to a surface.

FIG. 17 shows a variant of the embodiment shown in FIG. 1, in which the pocket of gas 1206 is attached to a surface 1219. In some ways this embodiment can also be seen as a variant of the embodiment shown in FIG. 7 in which the pocket of gas is also attached to a surface. In FIG. 17 the pocket of gas 1206 covers and fills a V-shaped tapering depression 1218, with two focusing pockets of fluid 1204 positioned in the non-gaseous medium 1202 above the target pocket of gas 1206. In the same manner as has been described above, the initial shockwave 1208 causes collapse of the focusing pockets of fluid 1204 which creates resultant shockwaves which are subsequently incident upon the target pocket of gas 1206. The more intense resultant shockwaves trap and compress the pocket of gas 1206 against the surface of the depression 1218, causing intense heating of the gas.

Indeed the incidence of the resultant shockwaves upon the target pocket of gas 1206 can, in some embodiments, result in a further transverse jet of the non-gaseous medium 1202 being formed which traverses the target pocket of gas 1206 such that a portion of the target pocket of gas 1206 is trapped between the tip of the jet and the tapering depression 1218 in the surface 1219. This impact of the transverse jet against the surface of the depression 1218 can cause both intense heating and compression of the target pocket of gas 1206 as well as a shockwave in the surface 1219. Therefore if the surface 1219 comprises fuel or reactants, this can trigger the desired reaction in the material of the surface 1219.

Figure 18:
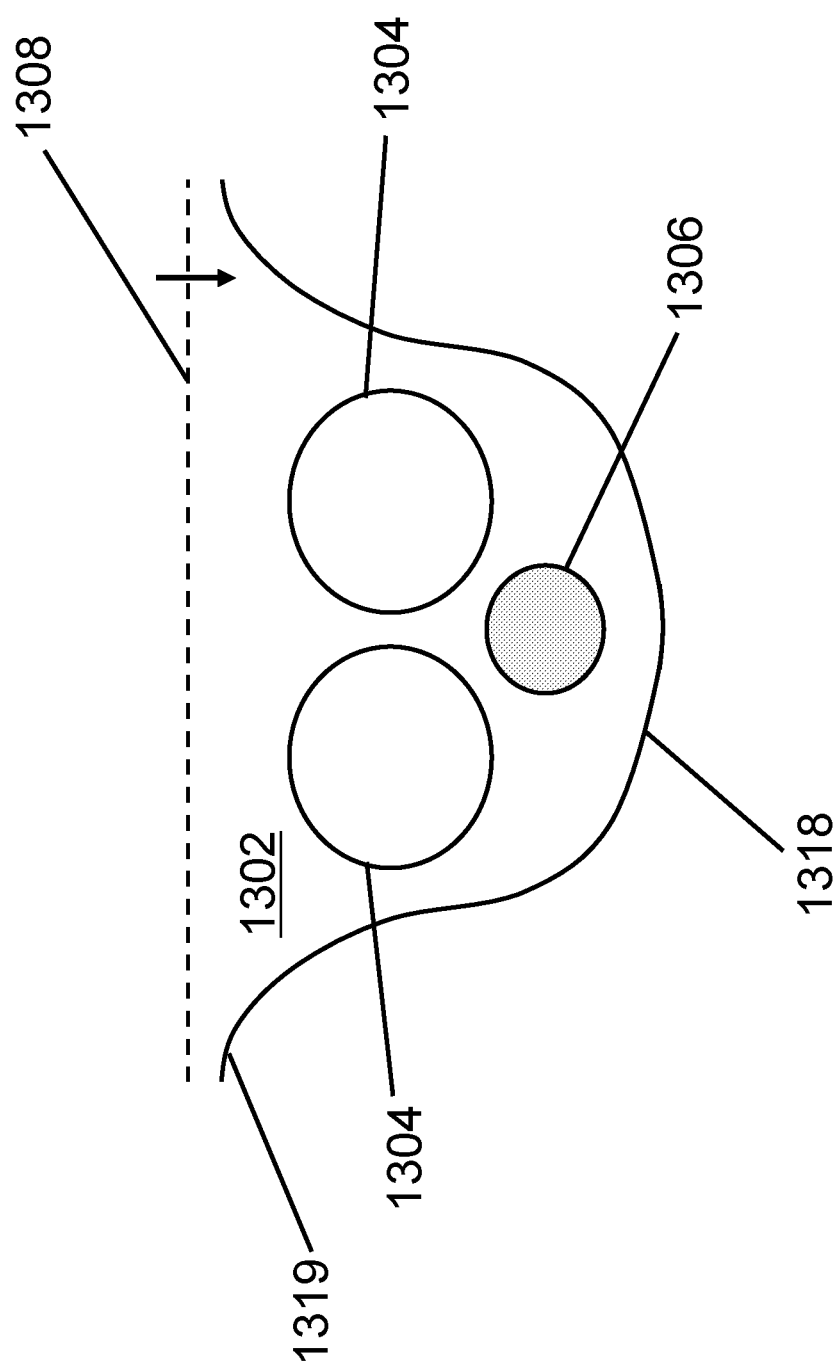
FIG. 18 shows a variant of the embodiment of FIG. 1 in which the pockets of gas and fluid are located within and spaced from a depression in a surface.

FIG. 18 shows a variant of the embodiment shown in FIG. 1, in which the pocket of gas 1306 and two focusing pockets of fluid 1304 are positioned within the non-gaseous medium 1302 and spaced from a rounded concave depression 1318 in a surface 1319. When the shockwave 1308 is generated within the non-gaseous medium 1302, it is first incident upon the focusing pockets of fluid 1304 and acts to compress them in a similar manner to the previous embodiments. At the same time, the shockwave 1308 is reflected from the upper sides of the concave depression 1318 in the surface 1319.

Once the shockwave 1308 has passed through the focusing pockets of fluid 1304, creating resultant shockwaves which are subsequently incident upon the target pocket of gas 1306, the shockwave 1308 is reflected from the surface 1319 and travels back towards the target pocket of gas 1306. The reflected shockwave has a shape resembling the shape of the concave depression 1318 and is focussed towards the target pocket of gas 1306 upon which it is incident at the same time or shortly after the resultant shockwave from the collapse of the focusing pockets of fluid 1304, thus further compressing the focusing pocket of gas 1304 and further increasing the temperature and pressure within it.

Figure 19:
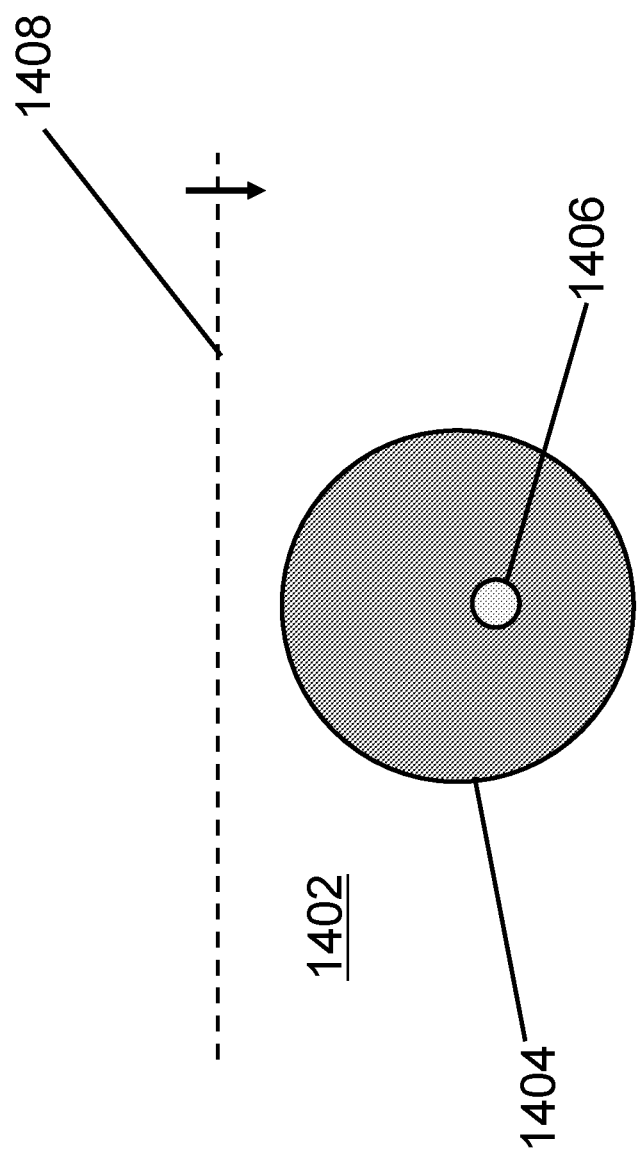
FIG. 19 shows a variant of the embodiments of FIGS. 8 and 15 in which the pocket of gas is within the pocket of fluid.

FIG. 19 shows a variant of the embodiments shown in FIGS. 8 and 15 in which the pocket of gas 1406 is within the focusing pocket of fluid 1404. In this embodiment the focusing pocket of fluid 1404 is a pocket of liquid which is less dense than the non-gaseous medium 1402 so that the target pocket of gas 1406 can be immobilised within the focusing pocket of fluid 1404. When the shockwave 1408 is incident upon the focusing pocket of fluid 1404, the shockwave 1408 collapses the focusing pocket of fluid 1404 in the same manner as in previous embodiments. This causes the shockwave to converge upon the target pocket of gas 1406, thus increasing the intensity of the shockwave subsequently incident upon the target pocket of gas 1406.

Although specific examples have been given, it will be appreciated that there are a large number of parameters that influence the actual results achieved, for example liquid or gel medium density, ambient pressure and temperature, composition of the non-gaseous medium and of the pockets of fluid and gas, impact angle and shape of the shockwave, and shape of the surface.

In all of the embodiments described, the apparatus can be used by creating a shockwave in the medium which is incident upon a pocket of fluid, where the fluid may be air, water vapour, argon, xenon or an oil, and then subsequently upon a pocket of gas containing deuterated water vapour or deuterium gas. In numerical modelling of the experiment, the techniques described herein give rise to a peak pressure of ~20 GPa which is sufficient to cause temperatures inside the collapsed volume of gas in excess of $1 \times 10^6$ Kelvin which can be sufficient for a nuclear fusion reaction of the deuterium atoms. In some non-limiting examples the resulting neutrons could be used in other processes, or could be absorbed by a neutron absorber for conversion of the kinetic energy of the neutrons to thermal energy and thus conventional thermodynamic energy generation.

The invention claimed is:

1. A method of producing a localised concentration of energy comprising:
creating at least one shockwave propagating through a non-gaseous medium so as first to be incident upon a focusing pocket of fluid within the medium, wherein the fluid in the focusing pocket of fluid has a different composition to the non-gaseous medium;
wherein the focusing pocket of fluid is positioned relative to a differently sized target pocket of gas within the medium, wherein the target pocket of gas is positioned on the opposite side of the focusing pocket from the direction of incidence of the initial shockwave such that the initial shockwave is incident upon the focusing pocket of fluid before being incident upon the target pocket of gas, such that the focussing pocket of fluid acts to shield the target pocket of gas from the initial shockwave, wherein the incidence of the shockwave on the focusing pocket of fluid concentrates the intensity of a shockwave subsequently incident upon the target pocket of gas.

2. A method as claimed in claim 1, wherein the target pocket is positioned on the opposite side of the focusing pocket from the direction of incidence of the initial shockwave.

3. A method as claimed in claim 1, wherein the focusing pocket of fluid is larger in size than the target pocket of gas.

4. A method as claimed in claim 1, wherein the focusing pocket of fluid has a diameter at least 1.5 times the diameter of the target pocket of gas.

5. A method as claimed in claim 1, wherein the non-gaseous medium has therein a plurality of focusing pockets of fluid.

6. A method as claimed in claim 5, wherein the plurality of focusing pockets of fluid are positioned relative to each other such that the centre of one focusing pocket of fluid is spaced from the centre of its adjacent focusing pocket of fluid by less than 2 times the diameter of the larger of the two adjacent focusing pockets of fluid.

7. A method as claimed in claim 1, wherein one or more further pockets of fluid are positioned in the non-gaseous medium further away from the initial shockwave than the target pocket of gas.

8. A method as claimed in claim 1, wherein the non-gaseous medium has therein a plurality of target pockets of gas.

9. A method as claimed in claim 1, wherein the shielding for the target pocket of gas comprises a solid obstacle positioned between the target pocket of gas and the initial shockwave, wherein the solid obstacle is arranged to shield the target pocket of gas from the initial shockwave and to deflect the incident shockwave away from the target pocket of gas.

10. A method as claimed in claim 1, wherein a plurality of shockwaves is applied from a plurality of different directions to the non-gaseous medium.

11. A method as claimed in claim 1, wherein the shockwave is a non-planar shockwave.

12. A method as claimed in claim 1, wherein the target pocket of gas is attached to a surface.

13. A method as claimed in claim 12, wherein the surface comprises a depression shaped so as partially to receive the target pocket of gas.

14. A method as claimed in claim 12, wherein the surface is concave to concentrate the intensity of the resultant shockwave which is incident upon the target pocket of gas.

15. A method as claimed in claim 1, wherein the target pocket of gas is spaced from a surface.

16. A method as claimed in claim 15, wherein the surface is concave so as at least partially to reflect the resultant shockwave in such a way as to direct it onto the target pocket of gas.

17. A method as claimed in claim 1, wherein the target pocket of gas is in contact with the focusing pocket of fluid.

18. A method as claimed in claim 17, wherein the target pocket of gas is either attached to or contained within the focusing pocket of fluid.

19. A method as claimed in claim 1, wherein the focusing pocket of fluid and the target pocket of gas are of different compositions.

20. A method of producing a localised concentration of energy comprising:
creating at least one shockwave propagating through a non-gaseous medium so as first to be incident upon a focusing pocket of fluid within the medium, wherein the fluid in the focusing pocket of fluid has a different composition to the non-gaseous medium;
wherein the focusing pocket of fluid and a solid obstacle are positioned within the medium relative to a target pocket of gas within the medium, wherein the solid obstacle is positioned between the target pocket of gas and the initial shockwave such that the solid obstacle is arranged to shield the target pocket of gas from the initial shockwave, and wherein the incidence of the shockwave on the focusing pocket of fluid is arranged to concentrate the intensity of a shockwave subsequently incident upon the target pocket of gas.

21. A method of producing a localised concentration of energy comprising:
creating at least one shockwave propagating through a non-gaseous medium, said non-gaseous medium containing a focusing pocket of fluid and a target pocket of gas, wherein the target pocket of gas is positioned on the opposite side of the focusing pocket from the direction of incidence of the initial shockwave such that the shockwave is first incident upon the target pocket of gas before being incident upon the target pocket of gas, wherein the fluid in the focusing pocket of fluid has a different composition to the non-gaseous medium;
wherein the target pocket of gas is of different size to the focusing pocket of fluid and the centre of the focusing pocket of fluid is spaced from the centre of the target pocket of gas by less than 1.5 times the diameter of the larger of the focusing pocket of fluid and the target pocket of gas such that the incidence of the shockwave on the focusing pocket of fluid creates a resultant, more intense shockwave which is subsequently incident upon the target pocket of gas.

22. A method as claimed in claim 21, wherein the target pocket of gas is smaller than the focusing pocket of fluid.

23. A method as claimed in claim 21, wherein the centre of the focusing pocket of fluid is spaced from the centre of the target pocket of fluid by less than 2.5 times the radius of the larger of the focusing pocket of fluid and the target pocket of gas.

24. A method as claimed in claim 21, wherein the focusing pocket is elongate in a direction, wherein the direction has at least a component parallel to the direction from which the shockwave approaches the focusing pocket.

25. A method of producing a localised concentration of energy comprising:
creating at least one shockwave propagating through a non-gaseous medium so as first to be incident upon a focusing pocket of fluid within the medium, wherein the fluid in the focusing pocket of fluid has a different composition to the non-gaseous medium;
wherein the focusing pocket of fluid is of different composition to the target pocket of gas and is positioned relative to a target pocket of gas within the medium, wherein the target pocket of gas is positioned on the opposite side of the focusing pocket from the direction of incidence of the initial shockwave such that the incidence of the shockwave on the focusing pocket of fluid concentrates the intensity of a shockwave subsequently incident upon the target pocket of gas.

* * * * *